(12) United States Patent
Zhou et al.

(10) Patent No.: US 9,301,229 B2
(45) Date of Patent: Mar. 29, 2016

(54) METHOD AND SYSTEM FOR TERMINAL HANDOVER IN WIRELESS COMMUNICATION SYSTEM

(75) Inventors: Na Zhou, Shenzhen (CN); Qiang Wu, Shenzhen (CN); Tao Fu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 776 days.

(21) Appl. No.: 13/581,325

(22) PCT Filed: Oct. 21, 2010

(86) PCT No.: PCT/CN2010/077950
§ 371 (c)(1),
(2), (4) Date: Aug. 27, 2012

(87) PCT Pub. No.: WO2011/110025
PCT Pub. Date: Sep. 15, 2011

(65) Prior Publication Data
US 2012/0320876 A1   Dec. 20, 2012

(30) Foreign Application Priority Data
Mar. 8, 2010   (CN) .......................... 2010 1 0128120

(51) Int. Cl.
*H04W 36/12*   (2009.01)
*H04L 29/12*   (2006.01)
(Continued)

(52) U.S. Cl.
CPC ............. *H04W 36/12* (2013.01); *H04L 61/103* (2013.01); *H04L 61/2084* (2013.01); *H04W 8/04* (2013.01); *H04W 8/26* (2013.01); *H04W 60/00* (2013.01); *H04W 88/16* (2013.01)

(58) Field of Classification Search
None
See application file for complete search history.

(56) References Cited

U.S. PATENT DOCUMENTS 8,516,256 B2   8/2013   Vogt et al.
2006/0240825 A1   10/2006   Funabiki et al.
(Continued)

FOREIGN PATENT DOCUMENTS

| CN | 1949923 | 4/2007 |
|---|---|---|
| CN | 100428719 | 10/2008 |

(Continued)

OTHER PUBLICATIONS

International Search Report for PCT/CN2010/077950, English translation attached to original, Both completed by the Chinese Patent Office on Dec. 16, 2010, All together 6 Pages.

(Continued)

*Primary Examiner* — Hassan Phillips
*Assistant Examiner* — Gautam Sharma
(74) *Attorney, Agent, or Firm* — Brooks Kushman P.C.

(57) ABSTRACT

A method and system for terminal switching in a wireless communication system are disclosed. A terminal accesses a packet data network through a packet data network gateway, when the terminal switches between gateways, the target gateway to which the terminal switches allocates a new Routing Identifier (RID) to the terminal, and stores a mapping relationship between the Access Identifier (AID) and the new RID of the terminal. The target gateway or the target mobility management entity (MME) of the terminal initiates a registration update request including the new RID of the terminal to the home Identity Location Register (ILR) of the terminal. After receiving the request, the home ILR of the terminal updates the stored AID-RID mapping information of the terminal according to the new RID of the terminal, and initiates a notification for updating the RID of the terminal to the opposite gateway and/or the opposite MME.

20 Claims, 11 Drawing Sheets

(51) Int. Cl.
*H04W 8/04* (2009.01)
*H04W 8/26* (2009.01)
*H04W 60/00* (2009.01)
*H04W 88/16* (2009.01)

(56) References Cited

U.S. PATENT DOCUMENTS

| | | | |
|---|---|---|---|
| 2007/0223410 A1* | 9/2007 | Oyama et al. | 370/310 |
| 2007/0248064 A1* | 10/2007 | Shaheen | 370/338 |
| 2008/0132237 A1* | 6/2008 | Yonenaga | 455/436 |
| 2008/0285518 A1 | 11/2008 | Dutta et al. | |
| 2009/0135834 A1* | 5/2009 | Guntur | 370/400 |
| 2009/0275332 A1 | 11/2009 | Niska et al. | |
| 2009/0290529 A1* | 11/2009 | Toyokawa et al. | 370/315 |
| 2010/0009678 A1* | 1/2010 | Munoz Munoz et al. | 455/433 |
| 2010/0272020 A1* | 10/2010 | Norp et al. | 370/328 |
| 2011/0003546 A1* | 1/2011 | Xiang et al. | 455/26.1 |
| 2011/0032901 A1* | 2/2011 | Xiang et al. | 370/331 |
| 2011/0103260 A1 | 5/2011 | Jeyatharan et al. | |
| 2011/0196961 A1* | 8/2011 | Wang et al. | 709/224 |

FOREIGN PATENT DOCUMENTS

| | | |
|---|---|---|
| JP | 2005160053 | 6/2005 |
| JP | 2008141374 | 6/2008 |
| JP | 2008219490 | 9/2008 |
| JP | 2008289110 | 11/2008 |
| JP | 2009517893 | 4/2009 |
| WO | 2008068672 | 6/2008 |
| WO | 2009091306 | 7/2009 |
| WO | 2009153943 | 12/2009 |

OTHER PUBLICATIONS

Extended European Search Report for EP 10847283.8, Completed by the European Patent Office, Dated Jun. 27, 2014, 7 Pages.

Rui et al. IEEE International Conference on Networking, Architecture and Storage 2009, pp. 171-174, "Network Access Control Mechanism based on Locator/Identifier Split."

Qiu et al. Proceeding of IC-NIDC 2009, p. 280-285, "A Distributed Mapping System to Support Mobility in Identifier/Locator Separation Architecture."

Hou et al. Second International Workshop on Computer Science and Engineering 2009, p. 54-58, "SILMS: A Scalable and Secure Identifier-to-Locator Mapping Service System Design for Future Internet."

Wong et al. 24th IEEE International Conference on Advanced Information Networking and Applications 2010, p. 252-259, "An Identifier-based Architecture for Native Vertical Handover Support."

* cited by examiner

METHOD AND SYSTEM FOR TERMINAL HANDOVER IN WIRELESS COMMUNICATION SYSTEM

CROSS-REFERENCE TO RELATED APPLICATION

This application is the U.S. national phase of PCT Appln. No. PCT/CN2010/077950 filed Oct. 21, 2010 which claims priority to Chinese Application No. 201010128120.1 filed Mar. 8, 2010, the disclosures of which are incorporated in their entirety by reference herein.

TECHNICAL FIELD

The present invention relates to the field of wireless communication technology, and in particular, to a method and system for terminal handover in a wireless communication system.

BACKGROUND OF THE RELATED ART

The Evolved Packet System (EPS) of the 3rd Generation Partnership Project (3GPP) is composed of an Evolved Universal Terrestrial Radio Access Network (E-UTRAN), a Mobility Management Entity (MME), a Serving Gateway (S-GW), a Packet Data Network Gateway (P-GW or PDN GW), a Home Subscriber Server (HSS), Authentication, Authorization and Accounting (AAA) server of 3GPP, a Policy and Charging Rules Function (PCRF) entity and other supporting nodes.

FIG. 1a illustrates the architecture of the EPS system according to the related art. As shown in FIG. 1a, a MME is responsible for related works of the control plane such as mobility management, processing of the non-access layer signaling, and subscriber mobility management context; a S-GW is an access gateway device connected with the E-UTRAN, forwarding data between the E-UTRAN and the P-GW and responsible for buffering paging waiting data; a P-GW is a border gateway between the EPS and the Packet Data Network (PDN), and is responsible for implementing functions such as access of the PDN and forwarding data between the EPS and PDN.

In 3GPP, a corresponding PDN network can be found through an Access Point Name (APN). Generally, one connection from the UE to the PDN is called as an IP Connectivity Access Network (IP-CAN) session.

When a terminal moves, the P-GW will server as an anchor point of the movement of the terminal (as shown in FIG. 1b). Based on the system in FIG. 1b, the specific steps of the flow of the terminal handover (as shown in FIG. 1c), and forwarding data through the interface between the S-GWs are described as follows:

step 1c01, a wireless-side network element judges that it needs to initiate a S1-based handover;

step 1c02, the source wireless-side network element sends Handover Required to the source MME;

step 1c03, the source MME sends Forward Relocation Request message to the target MME;

step 1c04, the target MME initiates Create Session Request including information associated with the P-GW to the target S-GW;

step 1c05, the target S-GW returns Create Session Response message to the target MME; in this step, tunnel information such as tunnel identifier allocated by the target S-GW for establishing a tunnel between the target S-GW and the target wireless-side network element.

Step 1c06, the target MME requests the target wireless-side network element to execute the handover;

In this step, the tunnel information allocated by the target S-GW will be delivered to the target wireless-side network element.

Step 1c07, the target wireless-side network element responds to the target MME with Handover Request Acknowledgement message;

In this step, the target wireless-side network element creates UE context and reserves resources, the Handover Request Acknowledgement message includes the tunnel information allocated by the target wireless-side network element (which is herein allocated for establishing a tunnel between the target wireless-side network element and the target S-GW), and also needs to include the forwarding tunnel information between S-GWs.

Step 1c08, the target MME initiates Create Indirect Data Forwarding Tunnel Request to the target S-GW to establish a data forwarding tunnel between S-GWs;

step 1c09, the target S-GW returns to the target MME a Create Indirect Data Forwarding Tunnel Response including a forwarding tunnel identifier;

step 1c10, the target MME sends to the source MME a Forward Relocation Response message;

step 1c11, the source MME initiates Create Indirect Data Forwarding Tunnel Request, which includes the forwarding tunnel identifier, to the source S-GW to request for establishing a data forwarding tunnel between S-GWs;

step 1c12, the source S-GW returns a Create Indirect Data Forwarding Tunnel Response to the source MME;

step 1c13, the source MME sends a handover command to the source wireless-side network element;

step 1c14, the source wireless-side network element sends the handover command to the terminal;

at this moment, the downlink data received by the source network and sent to the terminal will be sent to the target network via the forwarding tunnel between S-GWs;

step 1c15, the terminal initiates a handover confirm message to the target wireless-side network element;

step 1c16, the target wireless-side network element notifies the target MME to perform handover;

step 1c17, the target MME sends a Forward Relocation Complete Notification message to the source MME;

step 1c18, the source MME returns a Forward Relocation Complete Acknowledge message to the target MME;

step 1c19, the target MME requests the target S-GW to modify the bearer information to include the tunnel information allocated by the target wireless-side network element; after the target S-GW receives the tunnel information, if the S-GW is relocated, the target S-GW sends to the P-GW a Modify Bearer Request message to the P-GW including the tunnel information allocated by the target S-GW;

in this step, upon receiving the tunnel information allocated by the target wireless-side network element, the target S-GW establishes the tunnel to the target wireless-side network element for the terminal for sending downlink data messages of the terminal, and this tunnel is called as a downlink tunnel. In step 1c06, upon receiving the tunnel information allocated by the target S-GW, the target wireless-side network element establishes a tunnel to the target S-GW for the terminal, which can be used to transmit uplink data messages of the terminal and is called as an uplink tunnel. The manner for establishing two network elements in each place of the text is similar, and thus will not be repeated here.

Step 1c20, if the S-GW is relocated, the target P-GW responds to the target S-GW with a modify bearer response. The target S-GW responds to the target MME with the modify bearer response;

step 1c21, the flow of deleting the source network session and releasing the forwarding tunnel is executed. This flow may be triggered by the source MME through a timer.

As can be seen, the prior art only considers adopting the anchoring manner to achieve continuity of services during the process of terminal movement, but this method of fixing anchor point causes a problem of circuitous paths of the data packets, thus aggravating transmission delay and bandwidth waste.

The above existing problems are essentially caused by the communality of address and identity of Transmission Control Protocol/Internet Protocol (TCP/IP). In order to solve these problems, many new mobility management technologies are proposed currently in the industry, and the essential conception thereof is subscriber identity and location separation technology. There is already a solution of Subscriber Identifier & Locator Separation Network (SILSN) in the related art, for example, host-based implementation such as Host Identity Protocol (HIP) technology, and router-based implementation such as Locator/ID Separation Protocol (LISP) technology, each of which contains many technologies for support. In these solutions, the Access Identifier (AID) of the terminal subscriber does not change during the movement process, and routing and forwarding of data messages are implemented by additionally allocating a Routing Identifier (RID) according to the location of the terminal.

FIG. 1d illustrates an architecture of SILSN. The network topology of the SILSN architecture is divided into an access network and a backbone network that do not overlap with each other in the topology relationship. The access network is located on the border of the backbone network, and is responsible for access of all terminals, while the backbone network is responsible for routing and forwarding of data messages between accessed terminals. In the networks, AID is used to indicate the subscriber identifier of the terminal, and it remains unchanged during the movement of the terminal; RID is used to indicate the locator allocated to the terminal by the network and is used in the backbone network. It should be pointed out that the identifier and the locator may have different names in different SILSN architectures, which should be regarded as equivalent.

In the SILSN architecture, the terminal may be one or more of mobile terminal, fixed terminal and nomadic terminal, for example, mobile phone, fixed phone, computer and server, etc.

In the SILSN architecture, the access network is used to provide two-layer (physical layer and link layer) access means, and maintain the physical access link between the terminal and the ASN.

In the SILSN architecture, the main network elements of the backbone network comprise:

An ASN, which is used to allocate a RID to the terminal, maintain the AID-RID mapping information of the terminal, register to the ILR (also called as registration) and inquire the RID of the terminal, and implement routing and forwarding of the data messages. The terminal has to access the backbone network via the ASN. The RID allocated by the ASN points to the local ASN, i.e., containing the address information of the ASN, and when the RID is used as the target address of a data message, the data message will be routed to this ASN.

A Common Router (CR), which is used to route according to the RID in the data message, and forward the data message with the target address being the RID.

An Identity Location Register (ILR), which is used to process registration, logoff and query of the RID of the terminal, store and maintain the AID-RID mapping information of the home subscriber terminal;

Optionally, the backbone network may further comprise:

A Packet Transfer Function (PTF), also called as a packet transfer function node, which is used to, after receiving a data message sent by the home subscriber terminal, inquire the RID of a correspondent opposite end according to the AID of the opposite terminal of the correspondent opposite end in the data message, encapsulate the RID in a header of the message, and then forward it to a general forwarding plane.

An Interconnect Service Node (ISN), which has interfaces connected with the common router, ASN and ILR, and is used to realize interconnection and intercommunication between two networks.

The above ILR, or ILR and PTF constitute the mapping forwarding plane of the backbone network, and the CR, or CR and ISN, constitutes the general forwarding plane of the backbone network.

Based on the network of SILSN architecture, since the access identifier and location of the terminal are separated, the terminal and the correspondent opposite end identify each other through the AID, which may be allocated for the terminal when assigning at the home subscriber server, for example it may be an IPV6/IPV4 address or IMSI or temporary identifier or NAI. The RID is used to realize routing and forwarding of data messages. When the terminal moves, the AID does not change so as to keep the communication relationship between the terminal and the correspondent opposite end, while the RID may be reallocated as the terminal moves so as to support the mobility of the terminal without any fixed anchor point, thus solving the problem of path circuitousness of the data packet.

When communication occurs in the SILSN architecture, the ASN should perform RID encapsulation and forwarding after receiving uplink data messages (i.e., data messages sent from the terminal to the correspondent opposite end). Specifically, the ASN inquires locally the RID of the correspondent opposite end, if the RID is inquired out, the RID of the correspondent opposite end as the target address and the RID of the terminal as the source address are encapsulated into a data message containing the AID of the terminal and the AID of the correspondent opposite end, which is then forwarded to the ASN which the correspondent opposite end accesses via the general forwarding plane. If the RID is not inquired out, the RID of the correspondent opposite end is inquired in the home ILR of the correspondent opposite end and is then stored locally. At this moment, the message may be encapsulated with the RID of the terminal and is then forwarded to the general forwarding plane via the mapping forwarding plane, or after the RID of the correspondent opposite end is inquired out, the ASN performs RID encapsulation and forwarding processing in the manner as adopted when the RID of the correspondent opposite end is inquired out locally. In the downlink direction, the ASN de-encapsulates the RID after receiving the data message sent from the general forwarding plane, strips out the RID therein and then sends the data message to the terminal.

As can be seen, in order to realize normal forwarding of the message, the ASN needs to allocate a RID for the terminal when the terminal accesses the ASN, registers the RID to the ILR to update the RID of the terminal in the ILR. The ASN also needs to maintain the AID-RID mapping information of the terminal and its correspondent opposite end to realize RID encapsulation of the message. In an example, for each terminal, the ASN maintains communication relationship information between the terminal and the correspondent opposite end, which is herein referred to as the opposite terminal information of the terminal and comprises the corresponding relationship between the AID of the terminal and the AID of the correspondent opposite end, for example, the opposite terminal information may be in the form of a correspondent opposite end list, which records the AIDs of all correspondent opposite ends of the terminal; the opposite terminal information may also comprise the AID-RID mapping information of the correspondent opposite end, i.e., the ASN collectively maintains the AID-RID mapping information of the correspondent opposite ends of all terminals, for example, the ASN stores a mapping routing table, which stores the AID-RID mapping information of the correspondent opposite ends of all terminals accessing the ASN. Of course, the ANS may also maintain for each terminal the AID-RID mapping information of all correspondent opposite ends of the terminal respectively. Wherein, the purpose of the ASN maintaining the correspondent end information is to determine what correspondent opposite ends the terminal has when the terminal has a handover, thereby sending the new RID of the terminal to the ASNs which the correspondent opposite end access according to the correspond opposite end information. After the ASNs which the correspondent opposite ends access complete update, the data messages sent from the correspondent opposite ends can be directly routed to the ASN to which the terminal moves. Before the ASNs which the correspondent opposite ends access complete update during the handover process, the source ASN needs to forward the message sent by the correspondent opposite end to the terminal to the target ASN.

However, the relate art has not proposed any corresponding solution for how to support identity and location separation of a terminal during a handover process of a communication system such as LTE in which the control plane is separated from the media plane, thereby avoiding circuitous routes.

In addition, during the handover process, the source ASN needs to send the maintained opposite end information to the target ASN, and the target ASN, after obtaining the opposite end information of the terminal from the source ASN, informs the ASNs which all correspondent opposite ends of the terminal access respectively to update the RID of the terminal, which causes a large amount of information (e.g., correspondent opposite end list) to be transmitted during the handover process.

SUMMARY OF THE INVENTION

The technical problem to be solved in the present invention is to provide a method and system for terminal handover in a wireless communication system so as to decrease circuitous paths of data packets, and reduce transmission delay and bandwidth waste.

In order to solve the above problem, the present invention provides a method for terminal handover in a wireless communication system, a terminal accessing a packet data network through a packet data network gateway, and when the terminal moves between gateways, the method comprising:

a target gateway to which the terminal moves allocating a new Routing Identifier (RID) to the terminal, and storing a mapping relationship between an Access Identifier (AID) and the new RID of the terminal; the target gateway or a target mobility management entity of the terminal initiating a registration update request including the new RID of the terminal to a home Identity Location Register (ILR) of the terminal;

after receiving the registration update request, the home ILR of the terminal updating stored AID-RID mapping information of the terminal according to the new RID of the terminal, and initiating a notification of updating the RID of the terminal to an opposite gateway and/or an opposite mobility management entity of the terminal according to opposite end information of the terminal which is received and/or stored locally.

The step of initiating a registration update request comprises: after allocating the new RID to the terminal, the target gateway directly initiating the registration update request to the home ILR of the terminal; or, the target gateway sending the new RID to the target mobility management entity, and the target mobility management entity initiating the registration update request to the home ILR of the terminal.

When the home ILR of the terminal only initiates the notification of updating the RID of the terminal to the opposite mobility management entity of the terminal, the opposite mobility management entity forwarding the notification to the opposite gateway after receiving the notification;

upon receiving the notification of updating the RID of the terminal sent by the home ILR or the opposite mobility management entity of the terminal, the opposite gateway updating the AID-RID information of the terminal.

Before handover, an source gateway of the terminal delivering the opposite end information of the terminal to the home ILR of the terminal directly or through an source mobility management entity, and the home ILR of the terminal locally storing the opposite end information of the terminal;

after receiving the registration update request, the home ILR of the terminal initiating the notification of updating the RID of the terminal according to the locally stored opposite end information of the terminal.

After the terminal moves, the source gateway transmits changed opposite end information to the home ILR of the terminal, and identifies the changed opposite end information as opposite end information to initiate RID update;

after receiving the opposite end information identified to initiate RID update, the home ILR of the terminal initiates the notification of updating the RID of the terminal to the corresponding opposite gateway.

The source gateway maintains the opposite end information including an AID of an opposite end of the terminal and AID-RID mapping information of the opposite end;

the opposite end information delivered by the source gateway to the home ILR of the terminal at least comprises the AID of the opposite end, or further comprises the AID-RID mapping information of the opposite end; if the opposite end information received by the home ILR of the terminal only comprises the AID of the opposite end, the RID of the opposite end needs to be inquired from a home ILR of the opposite end before initiating the notification of updating the RID of the terminal.

If the opposite end information received or stored by the home ILR of the terminal further comprises the AID-RID mapping information of the opposite end, the opposite gateway or mobility management entity of the terminal, after receiving the notification of updating the RID of the terminal, delivers to the home ILR of the opposite end the changed opposite end information, which comprises the AID of the terminal and the updated RID.

The source gateway delivers the changed opposite end information to the home ILR of the terminal in the following way:

after receiving Create Indirect Data Forwarding Tunnel Request of the target gateway, if judging that there is opposite end information changed after a last delivery, the source gateway delivers the changed opposite end information to the home ILR of the terminal; or, if judging that there is opposite end information changed after a last delivery when releasing a forwarding tunnel, the source gateway delivers the changed opposite end information to the home ILR of the terminal once; or, after receiving Create Indirect Data Forwarding Tunnel Request, the source gateway sets a delivery timer, and if judging when the delivery timer times out that there is opposite end information changed after a last delivery, the source gateway delivers the changed opposite end information to the home ILR of the terminal once.

During a handover process of the terminal, the target gateway establishes and maintains the opposite end information of the terminal by detecting data messages forwarded from the forwarding tunnel by the source gateway and data messages forwarded from a general forwarding plane by other gateways, and delivers periodically or in real time to the home ILR of the terminal the opposite end information determined by detecting the data messages forwarded from the general forwarding plane.

During a handover process of the terminal, the target gateway further establishes and maintains the opposite end information of the terminal by detecting data messages forwarded by a target serving gateway.

During a handover process of the terminal, the target gateway delivers to the home ILR of the terminal the opposite end information determined by detecting data messages forwarded from the forwarding tunnel by the source gateway and data messages forwarded by the target serving gateway, and identifies the opposite end information as opposite end information to initiate RID update.

After the terminal moves, the source gateway of the terminal and/or target gateway delivers the opposite end information of the terminal to the home ILR of the terminal directly or via a mobility management entity;

the home ILR of the terminal initiates the notification of updating the RID of the terminal according to the received opposite end information of the terminal and the registration update request.

When the target gateway initiates the RID registration request, or sends the new RID to the target mobility management entity, the maintained opposite end information of the terminal is included;

after receiving the new RID and the opposite end information, the opposite end information is included when the target mobility management entity initiates the RID registration request;

after receiving the RID registration request, the home ILR of the terminal initiates the notification of updating the RID of the terminal according to the opposite end information included in the RID registration request.

The source gateway and/or target gateway sets a delivery timer when establishing a forwarding tunnel, and when the delivery timer times out, deliver the maintained opposite end information of the terminal to the home ILR of the terminal; or, when the established forwarding tunnel is released, the source gateway and/or target gateway delivers the maintained opposite end information of the terminal to the home ILR of the terminal.

When delivering the opposite end information of the terminal to the home ILR of the terminal, the source gateway and/or target gateway notify the home ILR of the terminal to initiate a RID update notification; or identify the delivered opposite end information as opposite end information to initiate the RID update notification;

after receiving the opposite end information, the home ILR of the terminal initiates the notification of updating the RID of the terminal according to the notification of initiating RID update notification or the identifier of initiating RID update notification.

The target gateway or the source gateway sets a release timer when establishing a forwarding tunnel, and triggers a flow of executing deletion of an source network session and release of a forwarding tunnel according to a timing period of the release timer.

The present invention also provides a system for terminal handover in a wireless communication system, comprising a packet data network gateway, a mobility management entity, and an Identity Location Register (ILR) which has a signaling interface with the gateway and/or the mobility management entity, wherein:

the mobility management entity is configured to, after receiving a new Routing Identifier (RID) of a terminal sent by the gateway, initiate registration update including a new RID of the terminal to a home ILR of the terminal;

the gateway is configured to allocate a new RID to a switched-in terminal, and store a mapping relationship between an Access Identifier (AID) and the new RID; and initiate registration update including the new RID of the terminal to the home ILR of the terminal, or send the new RID of the terminal to the mobility management entity; and, after receiving a notification of updating a RID of an opposite end from a correspondent opposite end, update RID information of the opposite end, and return an update response;

the ILR is configured to, after receiving the registration update, update stored AID-RID mapping information of the terminal according to the new RID of the terminal, and initiate a notification of updating the RID of the terminal to an opposite gateway and/or an opposite mobility management entity of the terminal according to opposite end information of the terminal which is received and/or stored locally; and, update the RID information of the opposite end after receiving the notification of updating the RID of the opposite end from the correspondent opposite end.

The gateway comprises:

an opposite end information maintaining module, configured to maintain the opposite end information of the terminal, comprising an AID of an opposite end of the terminal and AID-RID mapping information of the opposite end of the terminal;

an opposite end information delivering module, configured to deliver the opposite end information of the terminal to the home ILR of the terminal directly or via an source mobility management entity, wherein, the delivered opposite end information of the terminal at least comprises the AID of the opposite end of the terminal.

The opposite end information maintaining module is further configured to:

when receiving an uplink data message sent by the terminal to the correspondent opposite end and a downlink data message sent by the correspondent opposite end to the terminal, check an AID of the correspondent opposite end in the uplink or downlink data message, and inquire whether information of the correspondent opposite end is stored locally according to the AID of the correspondent opposite end, if not, store the opposite end information, the opposite end information at least comprising the AID information of the correspondent opposite end; and, when detecting through real-time streaming or receiving a notification that the correspondent opposite end of the terminal is offline, delete information of the correspondent opposite end from the maintained opposite end information.

The opposite end information delivering module is configured to deliver the opposite end information of the terminal to the home ILR of the terminal directly or via the source mobility management entity in real time or periodically;

the ILR comprises: an information storing module, configured to store the AID-RID mapping information of the terminal, and receive the opposite end information of the terminal; an information updating and notifying module, configured to, after receiving the registration update, update stored AID-RID mapping information of the terminal, and initiate a notification of updating the RID of the terminal to an opposite gateway and/or an opposite mobility management entity of the terminal according to the stored opposite end information of the terminal.

The opposite end information delivering module is configured to, when a terminal has a handover, deliver the opposite end information of a move-out terminal and a switched-in terminal to the home ILR of the terminal directly or via the mobility management entity;

the ILR comprises: an information storing module, configured to store the AID-RID mapping information of the terminal; an information updating and notifying module, configured to, after receiving the registration update, update stored AID-RID mapping information of the terminal, and initiate a notification of updating the RID of the terminal to an opposite gateway and/or an opposite mobility management entity of the terminal according to the received opposite end information of the terminal.

The information updating and notifying module is further configured to inquire the RID of the correspondent opposite end locally or to the home ILR of the correspondent opposite end according to the AID of the correspondent opposite end in the opposite end information of the terminal, and send the notification of updating the RID of the terminal, which includes the AID of the terminal and the new RID, to a gateway or mobility management entity of the correspondent opposite end.

The system further comprises a Serving Gateway (S-GW) connected with the gateway, the gateway further comprises:

a move-in control module, configured to allocate a new RID pointing to the gateway for a move-in terminal, and store mapping information between the AID of the terminal and the new RID;

a message forwarding module, configured to perform RID encapsulation, RID de-encapsulation and forwarding processing for the move-in terminal and a move-out terminal;

a first tunnel establishing module, configured to establish a forwarding tunnel between the move-in terminal and a target S-GW for the move-in terminal;

the S-GW is configured to establish between the move-in terminal and the target gateway and the target wireless-side network element for the move-in terminal, forwarding data message, and deliver information interacted between the mobility management entity and the gateway.

The gateway further comprises an RID registering module; the move-in control module of the gateway is further configured to activate the RID registering module after allocating a new RID to the move-in terminal; the RID registering module is configured to initiate registration update, which includes the new RID of the move-in terminal, to the home ILR of the move-in terminal; or the move-in control module of the gateway is further configured to, after allocating the new RID to the move-in terminal, deliver the new RID to the target mobility management entity via the target S-GW; the target mobility management entity further comprises an RID registering module, and the RID registering module of the target mobility management entity is further configured to, after receiving the new RID of the move-in terminal, initiate registration update, which includes the new RID of the move-in terminal, to the home ILR of the move-in terminal.

The gateway further comprises a second tunnel establishing module; the move-in control module of the gateway is further configured to activate the second tunnel establishing module after allocating the newRID to the move-in terminal;

the second tunnel establishing module is configured to send Create Indirect Data Forwarding Tunnel Request, which includes tunnel information allocated for the gateway to establish a forwarding tunnel to an source gateway for the move-in terminal, to the source gateway of the move-in terminal via a signaling interface between gateways; and, after receiving a request for establishing a forwarding tunnel for a move-out terminal sent from the target gateway, return a Create Indirect Data Forwarding Tunnel Response to the target gateway.

Compared with the prior art, the present invention at least has the following beneficial effects:

The mode of identifier and locator separation is adopted to achieve the mobility in a non-anchor mode in a wireless communication system, thereby solving the various problems caused by only fixed anchor point mechanism being used in the existing communication system, avoiding the phenomena of data circuitousness after movement, and efficiently improving the mobility performance of the terminal in the wireless communication system;

since the home ILR of the terminal stores in normal times, or receives during the handover process the uploaded opposite end information, transmission of a large amount of opposite end information between the move-in gateway and the move-out gateway during the handover process can be avoided through initiating an RID update flow to the opposite end by the ILR of the terminal.

BRIEF DESCRIPTION OF DRAWINGS

The description of drawings is used to provide further explanation on the present invention, and constitutes a part of the description to explain the present invention along with the examples of the present invention, rather than to limit the present invention. In the drawings.

PREFERRED EMBODIMENTS OF THE PRESENT INVENTION

The technical solution of the present invention will be further described in detail below with reference to the drawings and specific examples so that a person skilled in the art can better understand the present invention and include it out. However, the listed examples are not intended to limit the present invention.

In the present invention, the above SILSN architecture is applied to a network with separated control plane and media plane so as to realize a handover without a fixed anchor point. As can be known from the SILSN architecture and the working principle thereof recorded in the background art, when a terminal moves between ASNs, the target ASN at the move-in side should allocate an RID to the terminal, and initiates registration to the home ILR of the terminal; the source ASN at the move-out side should delete the AID-RID mapping information of the terminal, and maintain the opposite end information of the terminal, including the information about the corresponding relationship between the AID of the terminal and the AID of the correspondent opposite end, and the AID-RID mapping information of the correspondent opposite end of the terminal. In order that the message sent from the correspondent opposite end to the terminal can be rapidly routed to the target ASN, an RID update notification can be sent to the gateway which the correspondent opposite end accesses.

Based on the EPS network, three EPS networks adopting the SILSN architecture will be provided, and description mainly related to the improvement made on the source system necessary for realizing separation of identity and location of a terminal will be given below. In a network element needing to be upgraded such as P-GW and MME, in addition to the functional modules related with realization of separation of identity and location of a terminal mentioned below, other source functional modules of the EPS system should be retained and will be not described one by one below.

In this text, the network element which the correspondent opposite end accesses is called as an opposite end network element.

Network Architecture One

Figure 1A:
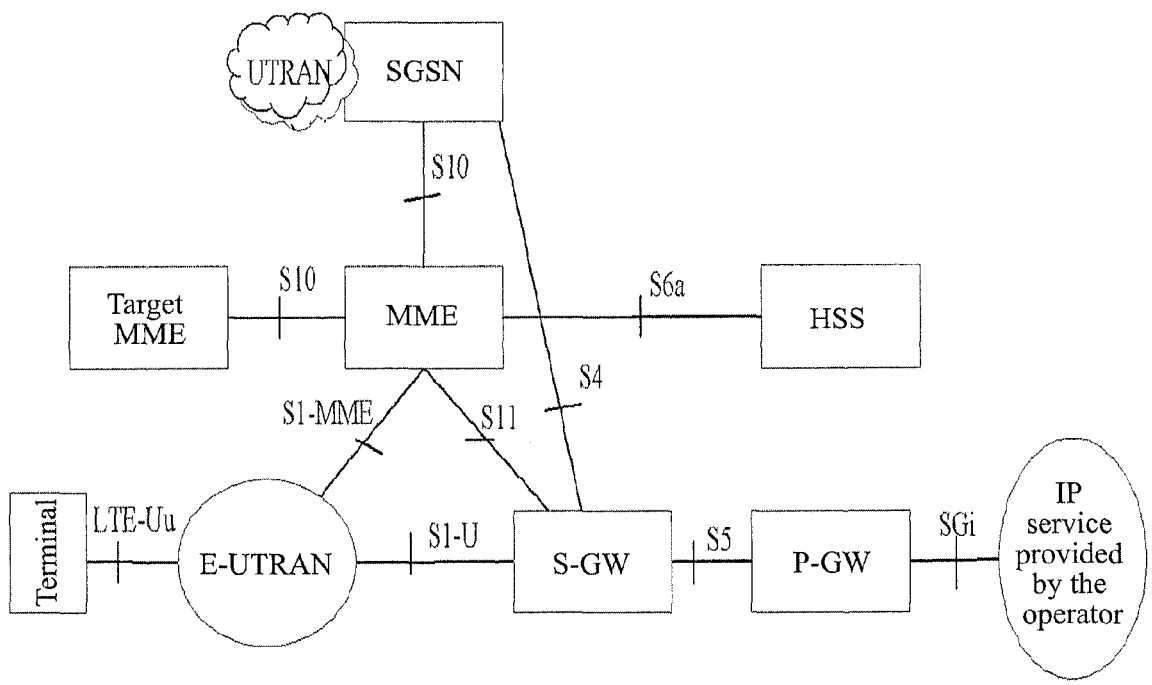
FIG. 1a illustrates the connectivity in a wireless communication network in the prior art.
Figure 1B:
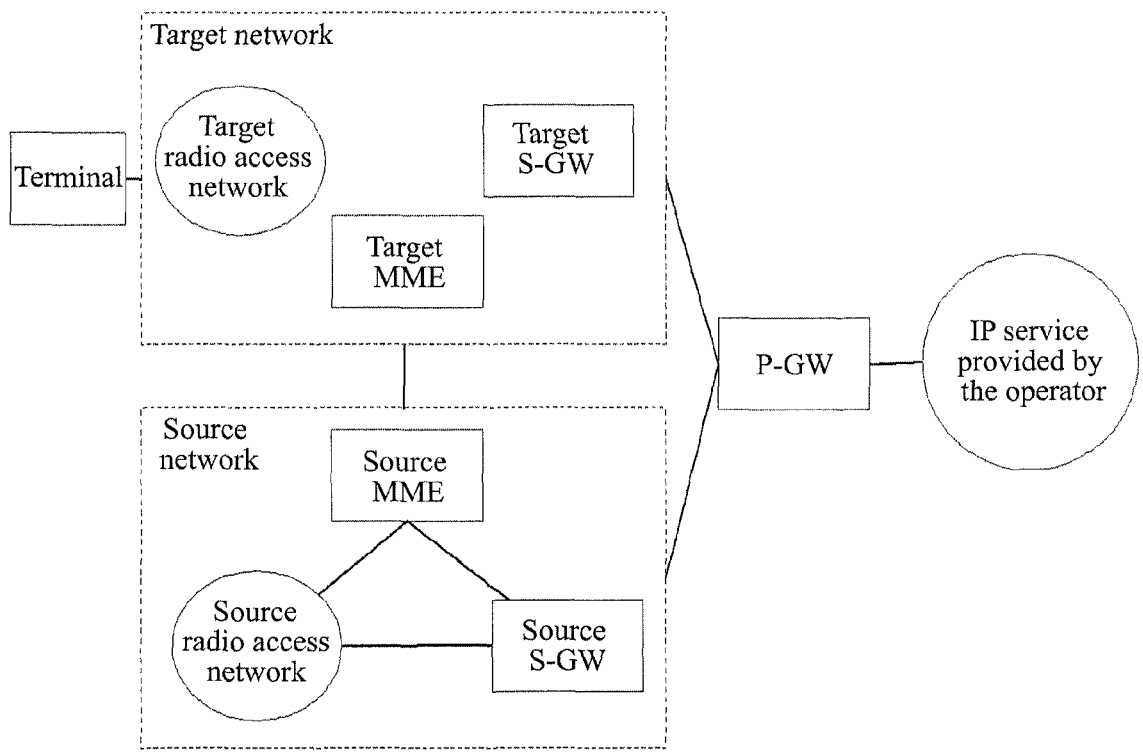
FIG. 1b illustrates a handover between S-GWs in a wireless communication network in the prior art.
Figure 1C:
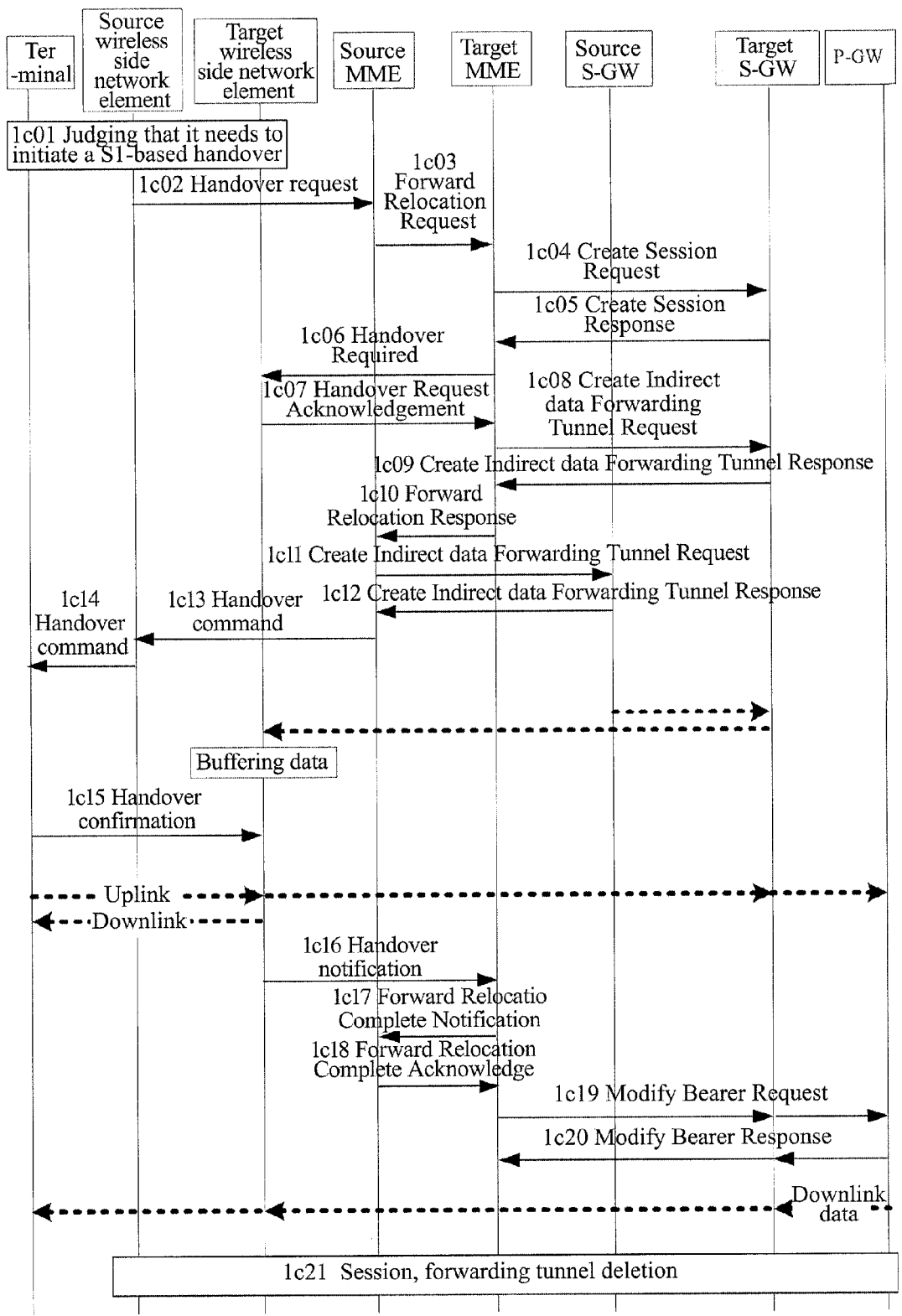
FIG. 1c is a flowchart of a handover of a terminal in the fixed anchor point mode in the prior art.
Figure 1D:
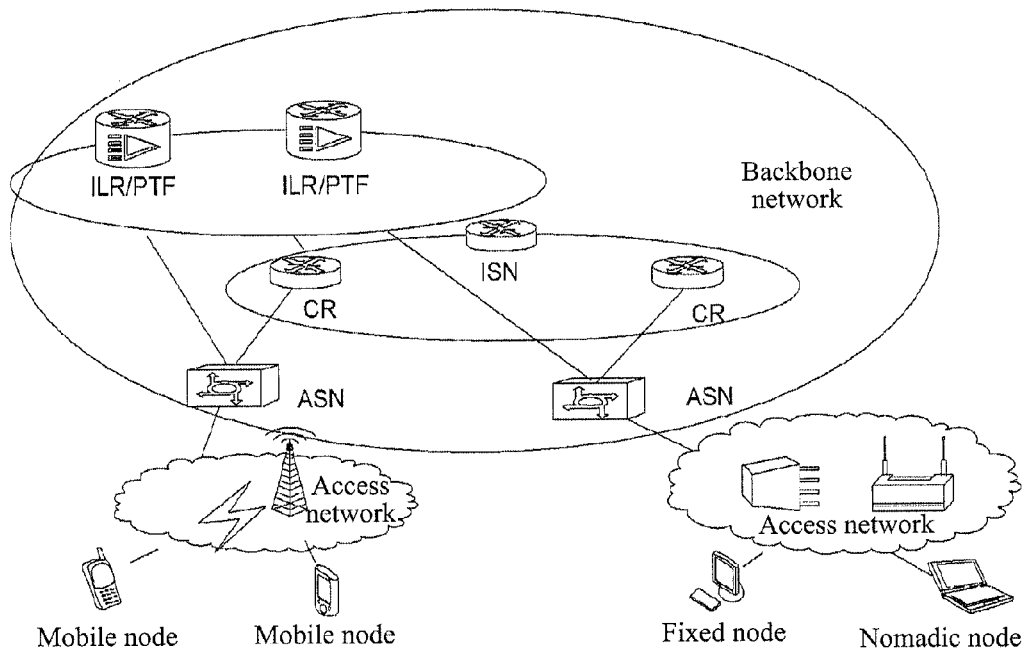
FIG. 1d illustrates the topology of the network of SILSN architecture according to an example of the present invention.
Figure 2:
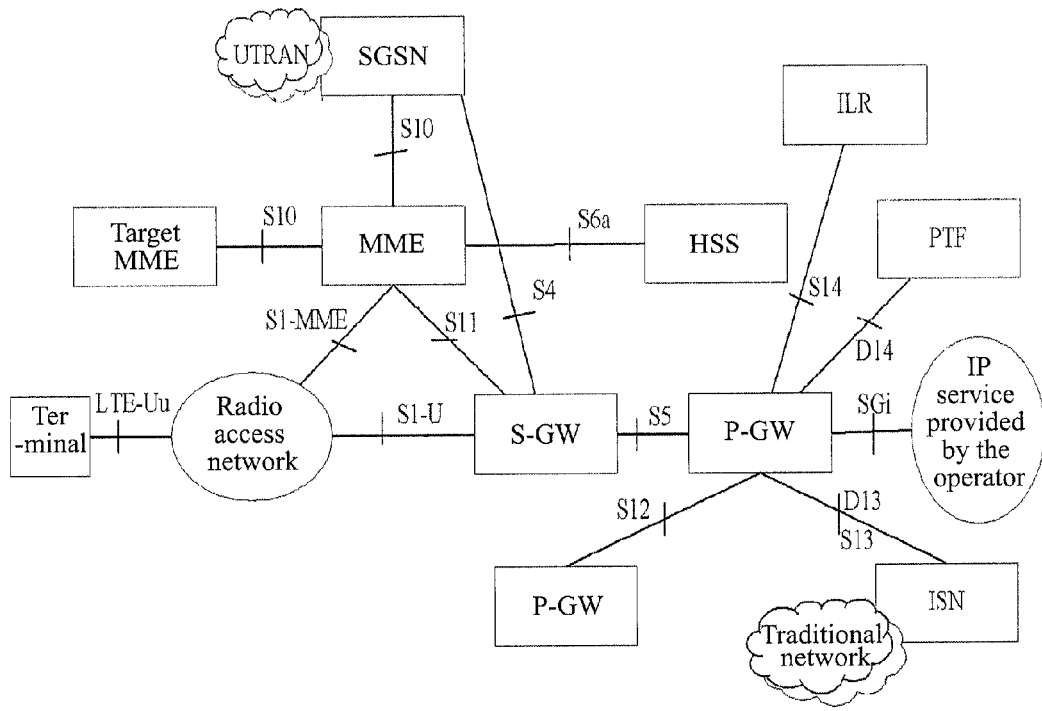
FIG. 2 illustrates the connectivity of a first EPS network adopting the SILSN architecture according to the present invention.

The first architecture of the EPS network with the SILSN architecture is as shown in FIG. 2, which shows the main network elements and connecting interfaces between various network elements in the network of the architecture.

The access network portion of the SILSN architecture is mainly implemented by the wireless access network in the EPS network, and the MME, S-GW and upgraded P-GW in the EPS network collectively achieve the functions to be implemented by the ASN. Meanwhile, network elements such as an ILR and a PTF having an interface with the P-GW are added. These network elements are logic network elements and can be integrated with the exiting network elements in the physical entity. The packet data network (PDN) to which the P-GW is connected and which supports RID routing and forwarding constitutes a general forwarding plane. There is a signaling interface between the P-GW and ILR, while there is not between the MME and the ILR, and processing associated with the AID and RID is mainly implemented in the P-GW.

Wherein:

The P-GW is used to provide access service for the terminal, allocate an RID to the terminal, maintain the AID-RID mapping information of the terminal, register to the home ILR of the terminal and cancel the RID of the terminal, inquire the RID of the correspondent opposite end from the home ILR of the correspondent opposite end, maintain the opposite end information of the terminal and deliver it to the home ILR of the terminal, perform RID encapsulation, RID de-encapsulation and forwarding for the data message, and realize a handover between P-GWs by coordinating with other network elements.

The ILR of the mapping forwarding plane is used to receive a registration request and a logoff request, maintain the AID-RID mapping information of the home subscriber terminal; after receiving an RID inquiry request, find out the corresponding RID according to the AID of the correspondent opposite end therein and return it to the inquiry requestor; after the handover of the terminal, send an RID update notification to the gateway which the opposite end accesses (which is called as an opposite end gateway, for example, P-GW, and may also be other gateways such as ISN) according to the opposite end information of the terminal. The ILR may be integrated with the home subscriber server on the entity or may also be provided separately.

The PTF may be integrated with the ILR on the entity or may also be provided separately, and it is used to, after receiving a data message of the home subscriber terminal sent by the P-GW, inquire out the corresponding RID according to the AID of the correspondent opposite end and encapsulate the RID into the header of the message, and then send the data message to the P-GW which the correspondent opposite end accesses. If what is received is a data message of a non-home subscriber terminal, the data message is sent to the home PTF to be processed.

Network Architecture Two

Figure 3:
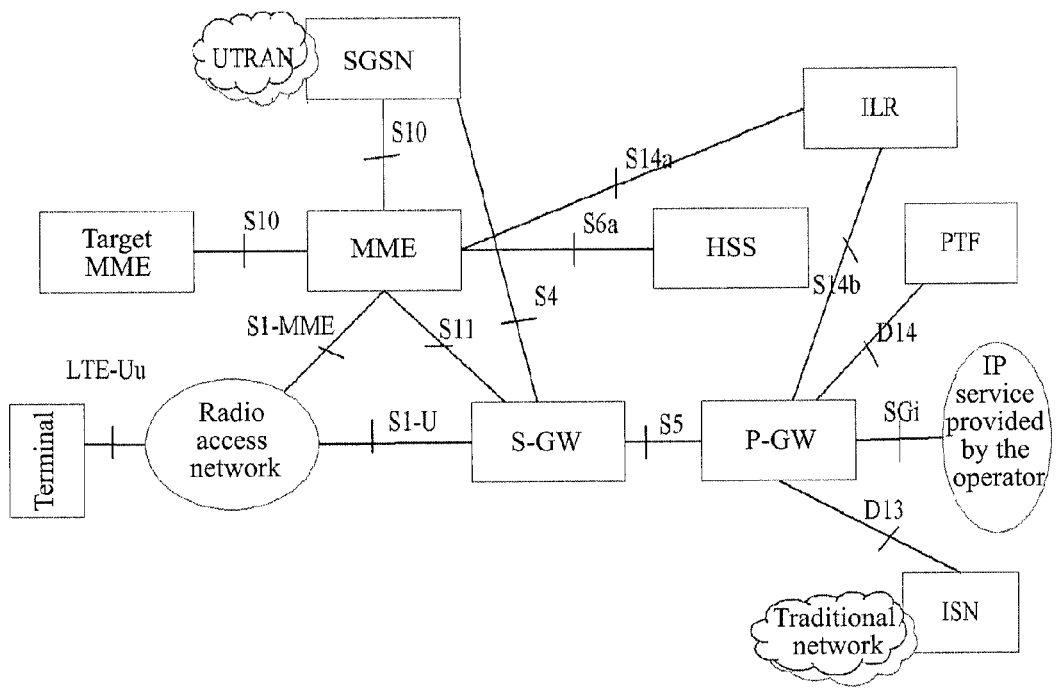
FIG. 3 illustrates the connectivity of a second EPS network adopting the SILSN architecture according to the present invention.

The second architecture of the EPS network with the SILSN architecture is as shown in FIG. 3, which shows the main network elements and connecting interfaces between various network elements in the network of the architecture. The access network portion of the SILSN architecture is mainly implemented by the wireless access network in the EPS network, and the S-GW, upgraded P-GW and MME in the EPS network collectively achieve the functions to be implemented by the ASN. Meanwhile, network elements such as an ILR and a PTF having an interface with the P-GW are added. These network elements are logic network elements and can be integrated with the exiting network elements in the physical entity. The packet data network (PDN) to which the P-GW is connected and which supports RID routing and forwarding constitutes a general forwarding plane. There is a signaling interface both between the P-GW and ILR and between the MME and the ILR. Part of the functions is implemented by the MME.

Wherein:

The P-GW is used to provide access service for the terminal, allocate an RID to the terminal, inquire the RID of the correspondent opposite end from the ILR, maintain the AID-RID mapping information of the terminal and its correspondent opposite end, perform RID encapsulation, RID de-encapsulation and forwarding for the data message, and realize a handover of the terminal between P-GWs by coordinating with other network elements.

The MME is used to register and cancel the RID of the terminal to the ILR, and realize a handover of the terminal between P-GWs by coordinating with other network elements.

The functions of the ILR and PTF are the same with those in architecture one, and thus will not be repeated here.

Network Architecture Three

Figure 4:
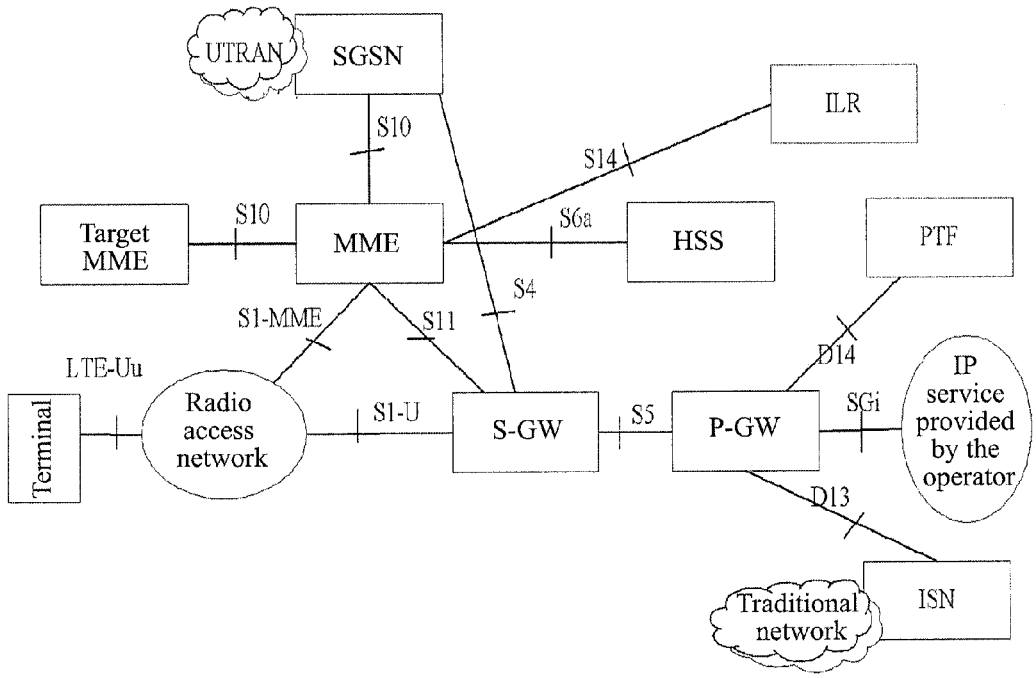
FIG. 4 illustrates the connectivity of a third EPS network adopting the SILSN architecture according to the present invention.

The third architecture of the EPS network with the SILSN architecture is as shown in FIG. 4, which shows the main network elements and connecting interfaces between various network elements in the network of the architecture. In this architecture, there is not any signaling interface between the P-GW and ILR, and there is one between the MME and the ILR.

The access network portion of the SILSN architecture is mainly implemented by the wireless access network in the EPS network, and the S-GW, upgraded P-GW and MME in the EPS network collectively achieve the functions to be implemented by the ASN. Meanwhile, network elements such as a PTF having an interface with the P-GW and an ILR having a signaling interface with the MME are added. These network elements are logic network elements, and can be integrated with the exiting network elements in the physical entity. The PDN to which the P-GW is connected and which supports RID routing and forwarding constitutes a general forwarding plane. Since there is no interface between the ILR and P-GW, compared with the architecture two, the P-GW needs to inquire out the RID of the correspondent opposite end from the ILR through the MME, and the MME needs to have additional function of inquiring the RID of the correspondent opposite end from the ILR according to the request of the P-GW and returning an inquiry result. In addition, the P-GW needs to deliver the maintained opposite end information to the ILR through the MME. Other functions of P-GW, ILR and MME are the same as in the architecture two, and thus will not be repeated here.

The above network architectures are all illustrated in a case of non-roaming terminal, and when the terminal roams, the P-GW or S-GW needs to interact with the home ILR/PTF of the terminal through the visited ILR/PTF, which has no effect on the handover flow of the terminal hereinafter.

The handover process of the terminal will be further explained below based on the above network architectures, and the source content of the source message during the handover will not be described in detail.

The technical solution provided in the present invention is based on the following two cases:

One, based on the case where the P-GW delivers the maintained opposite end information to the home ILR of the terminal in normal times, and the home ILR of the terminal stores the opposite end information of the terminal:

1. the source P-GW only needs to deliver the detected added opposite end information to the home ILR of the terminal and identifies it as the opposite end information to initiate RID update, and the source P-GW maintains the opposite end information until the forwarding tunnel is released or delivery is triggered by setting a delivery timer;

2. the target P-GW only uploads to the home ILR of the terminal the opposite end information determined to have changed by detecting the data message forwarded by the general forwarding plane;

3. after receiving the registration request, the home ILR of the terminal initiates a RID update flow to the opposite ends according to the stored opposite end information, and after receiving the changed opposite end information identified as needing to initiate RID update sent by the source P-GW subsequently, the home ILR of the terminal initiates update to these opposite ends again.

Two, based on the case where the P-GW delivers the maintained opposite end information to the home ILR of the terminal only during the handover:

1. the source P-GW and/or the target P-GW delivers the maintained opposite end information to the home ILR of the terminal;

2. after receiving the registration request and acquiring the new RID of the terminal, the home ILR of the terminal initiates a RID update flow to the opposite end according to the received opposite end information.

As regard to the second case, the source P-GW and/or the target P-GW can transmit the RID update notification at the mean time of delivering the opposite end information to the home ILR of the terminal; the home ILR of the terminal initiates a RID update flow to the opposite end according to the RID update notification and the opposite end information. Or, the home ILR of the terminal may also decide the time for initiating the RID update flow to the opposite end by itself after receiving the opposite end information, and preferably, the home ILR of the terminal initiates the RID update flow to the opposite end immediately after receiving the opposite end information because the opposite end can be notified as quickly as possible to update the RID of the terminal in time, thus avoiding the data from still being sent to the source P-GW due to the reason that the UE is not updated yet after completely handover to the target side.

The method for terminal handover provided in the present invention will be described in detail below with reference to the drawings and specific examples.

Figure 5:
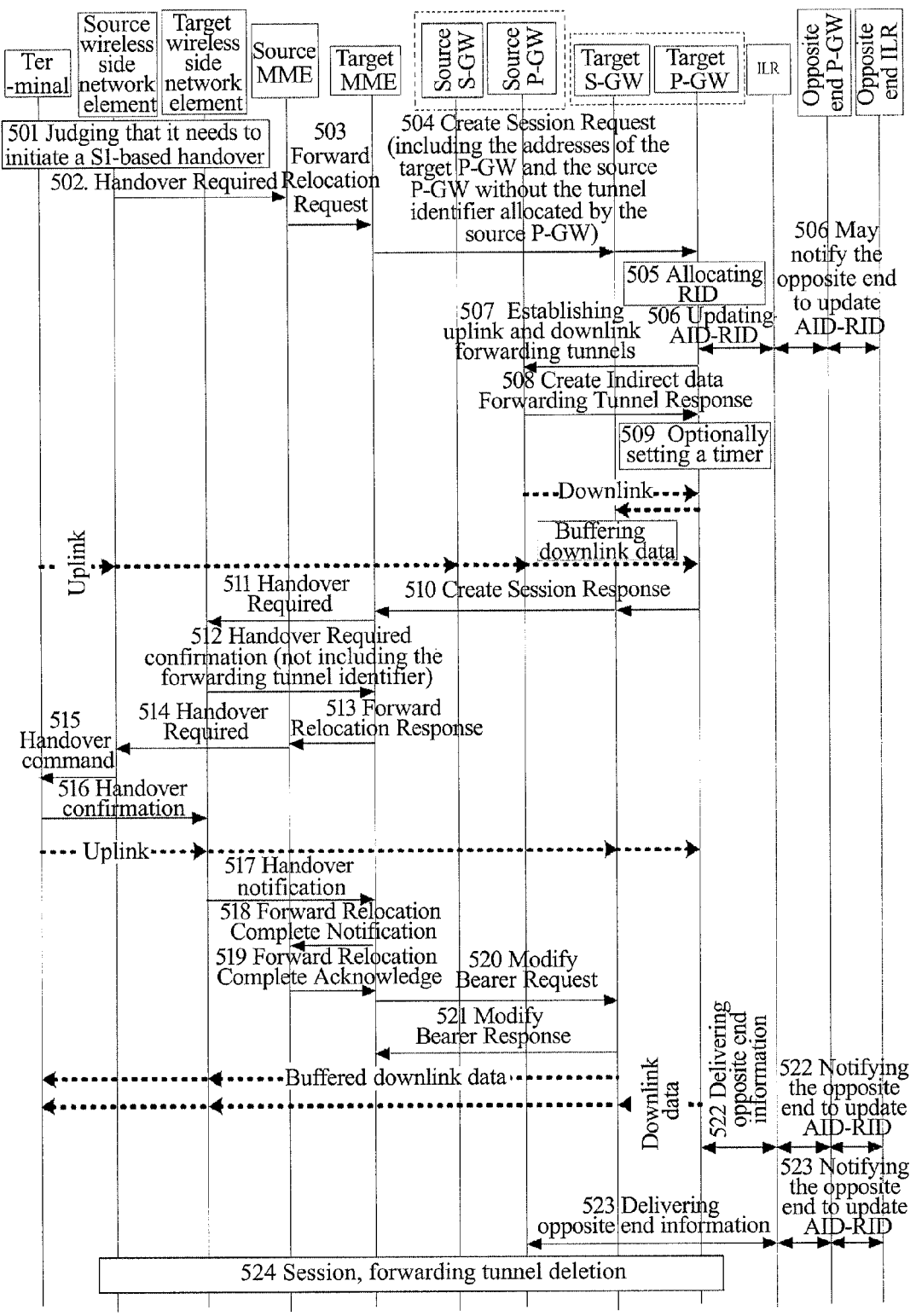
FIG. 5 is a first flowchart of a terminal handover between P-GWs provided in the present invention.

FIG. 5 illustrates a flow of the terminal handover between P-GWs based on the network architecture one as shown in FIG. 2, wherein a target P-GW different from the source P-GW is determined, two P-GW interact through a signaling interface therebetween to establish a data forwarding tunnel, and the specific steps of the flow as follows:

in step 501, the wireless side network element judges that an S1-based handover needs to be initiated;

in step 502, the source wireless side network element sends Handover Required to the source MME;

in step 503, the source MME sends Forward Relocation Request message, including the address of the source P-GW and the AID of the terminal, to the target MME;

in step 504, the target MME initiates Create Session Request, including the AID of the terminal, the address of the source P-GW and the address of the determined target P-GW, without the tunnel identifier allocated by the source P-GW, to the target S-GW, and the target S-GW sends Create Session Request, including the AID of the terminal and the address of the source P-GW, to the target P-GW;

Create Session Request sent from the target S-GW to the target P-GW may also include the tunnel information allocated for establishing a tunnel to the target P-GW.

In each example, the target MME may determine the target P-GW according to the local policy (for example, the location area where the terminal is located and/or network configuration information, including location area such as LAI, RAI, TAI or wireless side network element ID, etc.), or determine the target P-GW according to the instruction of the terminal or the wireless side network element. In an example, a P-GW which is the closest to the terminal and belongs to the same APN is selected according to the location area of the terminal. In another example, the target S-GW determines the target P-GW and informs the target MME of it.

In step 505, the target P-GW allocates a new RID to the terminal and stores the information about mapping between the AID of the terminal and the new RID;

in step 506, the target P-GW initiates RID registration to the home ILR of the terminal, and updates the RID of the terminal stored by the home ILR of the terminal to the new RID;

when the target P-GW initiates RID registration, it sends a RID registration request, which includes the AID and the new RID of the terminal, to the home ILR, and after receiving the request, the ILR updates the AID-RID mapping information of the terminal, i.e., updating the RID in the stored AID-RID mapping information of the terminal to the new RID.

After receiving the RID registration request, the home ILR of the terminal can initiate a RID update flow to the opposite end according to the opposite end information of the terminal stored locally, and send a RID update notification, including the AID and the new RID of the terminal, to the gateway of the opposite end. After receiving the RID update notification, the gateway of the opposite end updates the AID-RID mapping information of the terminal, i.e., updating the RID in the stored AID-RID mapping information of the terminal to the new RID included in the RID update notification.

Optionally, the registration update initiated by the target P-GW to the ILR of the terminal also includes the stored opposite end information. The ILR can notify the P-GW of the opposite end to update the AID-RID information of the terminal according to the received opposite end information and/or the locally stored d opposite end information. Optionally, after obtaining the update responses from all opposite ends, the ILR sends an opposite end information response message to the target P-GW.

In this text, preferably, the opposite end information of the terminal maintained by the gateway (for example the P-GW) includes the AID of the terminal and the AID-RID mapping relationship of the terminal, such that after a data message is received, forwarding of the data message can be directly implemented according to the opposite end information maintained locally. However, when the P-GW delivers the opposite end information to the home ILR of the terminal, it may only deliver the AID information of the opposite end, at which moment, the home ILR of the terminal can search for the corresponding RID information according to the AID information of the opposite end in the opposite end information, and send the RID update notification to the gateway of the opposite end. Of course, the opposite end information delivered by the P-GW may also include both the AID of the opposite end and the AID-RID mapping relationship of the terminal, at which moment the home ILR of the terminal can directly send the RID update notification to the gateway of the opposite end according to the RID information of the opposite end in the opposite end information.

Step 506 and step 507 can both be executed after step 505 without a fixed order.

In step 507, the target P-GW sends Create Indirect Data Forwarding Tunnel Request to the source P-GW to request for establishing uplink and downlink forwarding tunnels between the source P-GW and the target P-GW, wherein the request includes tunnel information allocated for establishing the uplink and downlink forwarding tunnels;

optionally, the new RID of the terminal is included in Create Indirect Data Forwarding Tunnel Request transmitted by the target P-GW in this step.

In step 508, the source P-GW returns a Create Indirect Data Forwarding Tunnel Response to the target P-GW;

optionally, if in step 503 the context information of the terminal does not include the source RID information of the terminal, then the source P-GW includes the AID information of the terminal and the source RID information in the response, wherein, the purpose of including the source RID information is to bring the source RID information of the terminal to the target P-GW. Since step 506 may be executed after step 508, in this case, the source RID of the terminal and the new RID information are included in step 506, and the ILR verifies whether the source RID is correct or not after receiving the RID registration update request, and when the source RID is verified to be correct, the ILR updates the AID-RID mapping information of the terminal; when the source RID is verified to be not correct, the ILR may perform various processing, for example, responding with a failure, not updating, recording in the backstage, etc. Or, in order that the ILR (for example when one AID corresponds to multiple RIDs) searches for the AID-RID mapping information of the terminal according to the source RID in this step to perform update.

After this step, the data flow direction is described as follows:

The flow direction of the downlink data message sent to the terminal received by the source P-GW is: the source P-GW—the target P-GW—the target S-GW, the data will be buffered in the target S-GW.

After this step, the P-GW of the opposite end with the updated RID of the terminal will directly send the data sent to the terminal to the target P-GW, and the flow direction of the downlink data sent to the terminal received by the target P-GW is: the target P-GW—the target S-GW, and the data will be buffered in the target S-GW.

The flow direction of the uplink data sent by the terminal is: the terminal—the source wireless side network element—the source S-GW—the source P-GW—the target P-GW, if the correspondent opposite end accesses different P-GWs, the target P-GW further forwards the data to the P-GW of the opposite end.

In step 509, optionally, the target P-GW sets an opposite end delivery timer and/or release timer;

wherein, the purpose of setting the opposite end delivery timer is to deliver the opposite end information to the ILR. The purpose of setting a release timer is to trigger the target P-GW to delete the forwarding tunnel. In addition, the target MME can also be used to set the release timer and notify the target P-GW to delete the forwarding tunnel after the timer times out.

Step 509 may be executed after step 505.

In step 510, the target P-GW returns Create Session Response message, which includes tunnel information allocated for establishing a tunnel to the target S-GW, to the target S-GW, and the target S-GW returns Create Session Response message to the target MME;

in step 511, the target MME requests the target wireless side network element to execute the handover;

in step 512, the target wireless side network element returns a Handover Required confirmation message to the target MME, without including the forwarding tunnel information;

in step 513, the target MME sends a Forward Relocation Response message to the source MME;

in step 514, the source MME sends a handover command to the source wireless side network element;

in step 515, the source wireless side network element sends the handover command to the terminal;

in step 516, the terminal initiates a handover confirmation message to the target wireless side network element;

in step 517, the target wireless side network element notifies the target MME to perform handover;

in step 518, the target MME sends a Forward Relocation Complete Notification message to the source MME;

in step 519, the source MME returns a relocation forward completion confirmation message to the target MME;

in step 520, the target MME requests the target S-GW to modify the bearer information, and the target S-GW does not send any Modify Bearer Request message to the P-GW;

in step 521, the target S-GW returns a modify bearer response to the target MME;

in step 522, the target P-GW maintains the opposite end information of the terminal, and delivers the opposite end information to the home ILR of the terminal periodically or in real time;

Step 522 may be executed immediately after step 508, or may be triggered to be executed when the opposite end information delivery timer set in step 509 times out.

In this example, the target P-GW establishes and maintains the opposite end information of the terminal by detecting the data messages forwarded from the forwarding tunnel by the source P-GW and the data messages forwarded by other P-GWs from the general forwarded plane. Herein, when maintaining the opposite end information, the P-GW can add the new AID of the correspondent opposite end that has been found or the AID-RID of the correspondent opposite end to the opposite end information by real-time flow detection mechanism and/or by checking the AID of the correspondent opposite end or the AID-RID of the correspondent opposite end in the data message; when it is acquired through real-time flow detection mechanism or receiving a notification of the opposite end that an opposite end is offline, the AID of the correspondent opposite end and the like from the opposite end information.

Optionally, the target P-GW also detects the uplink data messages delivered from the target S-GW (after step 516) so as to maintain the opposite end information of the terminal.

The so-called real-time delivery herein means that the target P-GW, upon finding that the opposite end information of the terminal has a change (for example, addition of a new correspondent opposite end, or deletion of the source correspondent opposite end), informs the home ILR of the terminal of the changed opposite end information; the so-called periodic delivery means that, when each timing time is out, the target P-GW informs the home ILR of the terminal of the opposite end information that has changed during this timing time. The ILR stores or updates the opposite end information of the terminal after receiving it. The above real-time or periodic delivery can continue until the terminal is offline or a new handover occurs, and is not limited to the process of handover.

Since the home ILR of the terminal has stored the opposite end information uploaded by the source P-GW, the target P-GW can only upload to the home ILR of the terminal the opposite end information determined to have changed by detecting the data messages forwarded to the general forwarding plane and the uplink data messages delivered from the target S-GW.

Optionally, the target P-GW may also upload the opposite end information found to have changed by detecting the data message forwarded by the source P-GW, but the opposite end information should be identified as needing to initiate RID update when being upload so as to be distinguished from the opposite end information that does not need to initiate RID update (added opposite end information determined by detecting the data message forwarded by other P-GWs from the general forwarding plane).

In step 523, the source P-GW delivers the changed opposite end information to the home ILR of the terminal, including added and deleted opposite end information, and optionally, the added opposite end information is identified as needing to initiate RID update;

after receiving the opposite end information identified as needing to initiate RID update, the home ILR of the terminal sends a RID update notification to the corresponding opposite end gateway, including the AID and the new RID of the terminal. The opposite end gateway updates the AID-RID mapping information of the terminal after receiving the RID update notification.

In view of the uploading mechanism, there are at least the following several cases:

1) after step 507, if it is judged that there is opposite end information changed after the last delivery, the source P-GW starts to deliver the changed opposite end information to the home ILR of the terminal, the delivery may be performed once, or multiple times of judgment and delivery can be performed in real time or periodically, until the forwarding tunnel is released;

2) when releasing the forwarding tunnel, if it is judged that there is opposite end information changed after the last delivery, the source P-GW delivers the changed opposite end information to the home ILR of the terminal once;

3) the source P-GW sets a delivery timer after receiving Create Indirect Data Forwarding Tunnel Request in step 507, and when the delivery timer times out, the source P-GW delivers the changed opposite end information to the home ILR of the terminal once if it is judged that there is opposite end information changed after the last delivery.

In this example, since the opposite end information of the terminal maintained by the ILR includes the AID and RID of the correspondent opposite end, when the RID of the terminal changes due to the handover, two ways can be adopted to update the AID-RID of the terminal in the home ILR of the opposite end:

1) after updating the AID-RID of the terminal, the opposite end P-GW uploads the changed opposite end information, which includes the updated AID-RID of the terminal, to the home ILR of the opposite end, and the home ILR of the opposite end updates the stored AID-RID of the terminal after receiving the changed opposite end information;

2) when sending the RID update notification to the opposite end P-GW, the home ILR of the terminal also sends the RID update notification to the home ILR of the opposite end, wherein the notification includes the updated AID-RID of the terminal, and the home ILR of the opposite end updates the stored AID-RID of the terminal after receiving the RID update notification.

In another example, if the opposite end information of the terminal maintained by the ILR only includes the AID of the correspondent opposite end, the ILR needs to inquire out the RID of the opposite end gateway from the home ILR of the opposite end before sending the RID update notification to the opposite end gateway. And when sending the RID update notification to the opposite end P-GW, the home ILR of the terminal does not need to send the RID update notification to the home ILR of the opposite end.

Optionally, the source P-GW may deliver the new RID information of the terminal to the home ILR of the terminal, and the home ILR of the terminal can authenticate the new RID of the terminal and sends the RID update notification to the opposite end gateway after the authentication is passed.

Optionally, if the terminal has multiple RIDs, the ILR may maintain the opposite end information of the terminal for each RID respectively, and correspondingly, both the source P-GW and the target P-GW need to include the corresponding RID when delivering the opposite end information.

In addition, since there exists a case where one opposite end AID corresponds to multiple RIDs in the opposite end information stored in the home ILR of the terminal, the home ILR of the terminal also needs to include the source RID when sending the RID update notification to the opposite end P-GW so that the opposite end ILR knows which RID of the terminal is to be updated.

In step 524, the flows of deleting the source network session and releasing the forwarding tunnel are executed.

Wherein, execution of the flow of releasing the forwarding tunnel can be triggered by the target P-GW according to the set releasing timer; or when the MME sets a releasing timer, the target P-GW can also trigger the execution of the flow of releasing the forwarding tunnel according to a releasing message sent by the MME; or, the execution may also be triggered by setting a releasing timer by the source P-GW (for example, setting a releasing timer in step 507).

In the above flow, the target S-GW finds in step 504 that the handover is a handover between P-GWs, the downlink data arriving subsequently need to be buffered until step 520 when the downlink data are sent to the terminal.

After the handover is completed, the forwarding path of the uplink data message is: the terminal→the target wireless side network element→the target S-GW→the target P-GW, and the target P-GW performs RID encapsulation and forwarding on the message, and the message is routed to the opposite end gateway via the PDN. The forwarding path of the downlink data message is: the target P-GW→the target S-GW→the target wireless side network element→the terminal, and the target P-GW performs RID de-encapsulation on the message. Thereby, the handover without a fixed anchor point is achieved, and path circuitousness is avoided. The forwarding paths after handover in different examples of other target P-GWs and source P-GWs are all the same with this.

In the above flowchart in FIG. 5, the source P-GW and the target P-GW need to maintain the opposite end information of the terminal respectively, which specifically has the following modes:

mode one, after the forwarding tunnel between the source P-GW and the target P-GW is established, the source P-GW detects the received message sent to the terminal and obtains the source address information to maintain the opposite end information, but does not perform RID de-encapsulation, instead, it modifies the target address information in the data message to the address information of the target P-GW and forwards it to the target P-GW; the target P-GW performs RID de-encapsulation on the message forwarded by the source P-GW, and maintains the opposite end information of the terminal;

mode two, after the forwarding tunnel between the source P-GW and the target P-GW is established, the source P-GW performs RID de-encapsulation and detection on the received message sent to the terminal to maintain the opposite end information of the terminal, and delivers the maintained opposite end information of the terminal to the target P-GW; the target P-GW does not need to perform RID de-encapsulation on the message forwarded by the source P-GW, but maintains the opposite end information of the terminal according to the opposite end information delivered by the source P-GW;

mode three, after the forwarding tunnel between the source P-GW and the target P-GW is established, the source P-GW performs RID de-encapsulation and detection on the received message sent to the terminal to maintain the opposite end information of the terminal, but makes one copy of the data message which is not de-encapsulated and forwards it to the target P-GW; the target P-GW performs RID de-encapsulation on the message forwarded by the source P-GW, and maintains the opposite end information of the terminal.

The above flowchart in FIG. 5 reflects the scenario where the target S-GW buffers data, and in a case where a target wireless side network element is used to cache data, step 520 and step 521 need to be moved up after step 512. Except the above difference, other steps are the same as in FIG. 5, and thus will not be described here.

As can be seen from the above flow, the source P-GW and the target P-GW collectively maintain the opposite end information of the terminal, and the correspondent opposite end list does not need to be delivered during the handover process, thus avoiding the processing performance being affected by excessive load of the P-GW. Of course, the source P-GW may also deliver the maintained opposite end information to the target P-GW, in which case, the target P-GW may not upload the opposite end information delivered from the source P-GW to the ILR.

Besides, in another example of the present invention, the ILR does not store the opposite end information of the terminal. For this case, the source P-GW sends the RID update notification to the home ILR of the terminal and delivers the maintained opposite end information only after handover occurs; the home ILR of the terminal initiates a RID update flow to the opposite end after receiving the RID update notification and the opposite end information.

The handover flow of this example mainly differs from the flowchart in the example as shown in FIG. 5 in the delivery of the opposite end information and the time of the home ILR of the terminal initiating the RID update flow to the opposite end. The steps in the handover flow of this example that are different from those in the handover flow as shown in FIG. 5 are not listed as follows:

1. in step 506, the target P-GW initiates a RID registration request, which includes the AID and the new RID of the terminal, to the home ILR of the terminal; the home ILR of the terminal updates the AID-RID mapping information of the terminal after receiving the RID registration request, initiates a RID update flow to the opposite end according to the opposite end information of the terminal locally stored, and sends a RID update notification to the opposite end gateway.

In this example, after receiving the RID registration request, the home ILR of the terminal may not send the RID update notification to the opposite end gateway at this moment since the opposite end information of the terminal is not locally stored.

Optionally, in this example, the target P-GW includes the maintained opposite end information in the mean time of initiating a RID registration request to the home ILR of the terminal, and the home ILR of the terminal can send the RID update notification to the opposite end gateway after receiving the RID registration request according to the opposite end information in the RID registration request.

2. in step 509, the target P-GW sets an opposite end information delivery timer and/or releasing timer;

in step 522, the target P-GW maintains the opposite end information of the terminal and delivers the opposite end information to the ILR periodically or in real time;

in this example, the target P-GW maintains the opposite end information of the terminal in the same way as in the above example, but the target P-GW does not deliver the maintained opposite end information of the terminal to the home ILR of the terminal during the handover process, therefore, no delivery timer is set, but a releasing timer can be set to trigger the flow of forwarding tunnel release.

Or, optionally, the source P-GW does not deliver the maintained opposite end information of the terminal to the home ILR of the terminal during the handover process, but only the target P-GW delivers the maintained opposite end information of the terminal to the home ILR of the terminal.

Or, optionally, both the source P-GW and the target P-GW deliver the maintained opposite end information of the terminal to the home ILR of the terminal.

3. in step 523, the source P-GW transmits changed opposite end information to the home ILR of the terminal, and identifies the changed opposite end information as opposite end information to initiate RID update; the time of the source P-GW transmitting the changed opposite end information to the home ILR of the terminal may have many cases as described above;

in this example, the source P-GW delivers the maintained opposite end information of the terminal to the home ILR of the terminal only after handover occurs. Specifically, the source P-GW may delivers the maintained opposite end information to home ILR of the terminal in real time or periodically after step 507; or, it may set a delivery timer, and delivers all the maintained opposite end information of the terminal to the home ILR of the terminal after the delivery timer times out; or, it may deliver all the maintained opposite end information to the home ILR of the terminal when the forwarding tunnel is released. Upon receiving the delivered opposite end information, the home ILR of the terminal initiates a RID update flow to the opposite end. Optionally, the opposite end information delivered by the source P-GW to the home ILR of the terminal may include the identifier to initiate a RID update.

As for the aforesaid case where the source P-GW does not deliver the maintained opposite end information of the terminal to the home ILR of the terminal during the handover process, but only the target P-GW delivers the maintained opposite end information of the terminal to the home ILR of the terminal, the step 523 may be omitted.

The handover flow of this example is substantially the same with the handover flow shown in FIG. 5 except the above differences, and will not be described here in detail.

Figure 6:
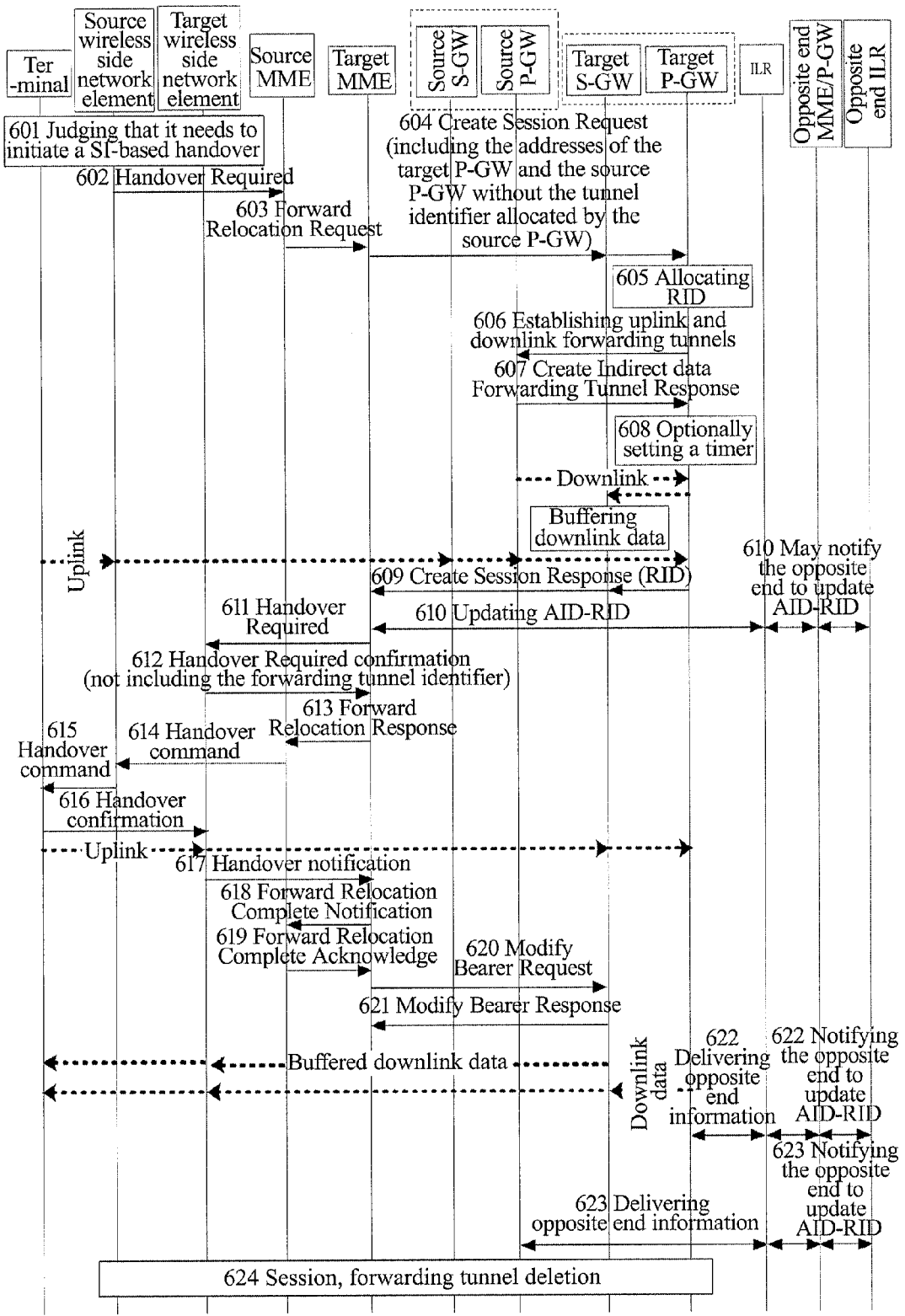
FIG. 6 is a second flowchart of a terminal handover between P-GWs provided in the present invention.

FIG. 6 shows a flow of a terminal handover between P-GWs based on the network architecture two shown in FIG. 3, wherein a target P-GW different from the source P-GW is determined, two P-GW interact through a signaling interface therebetween to establish a data forwarding tunnel.

This flow mainly differs from the flow in FIG. 5 in that in step 605 after the target P-GW allocates a new RID to the terminal, the RID is sent to the target MME (step 609), and the target MME initiates a registration update of the terminal to the ILR (step 610).

Other steps of the above flowchart in FIG. 6 are the same as that in FIG. 5 except the above difference, and will not be described here in detail.

In addition, as for the network architecture two (both the MME and the P-GW have an interface with the ILR) shown in FIG. 3, the step of the home ILR of the terminal initiate a RID update flow to the opposite end according to the received opposite end information of the terminal after updating the AID-RID mapping information of the terminal may also have another embodiment: the home ILR of the terminal sends a RID update notification, which includes the AID and the new RID of the terminal, to the opposite end MME. The opposite end MME forwards the received RID update notification to the opposite end gateway, and the gateway of the opposite end updates the AID-RID mapping information of the terminal according to the received RID update notification, i.e., updating the RID in the stored AID-RID mapping information of the terminal to the new RID included in the RID update notification.

Figure 6A:
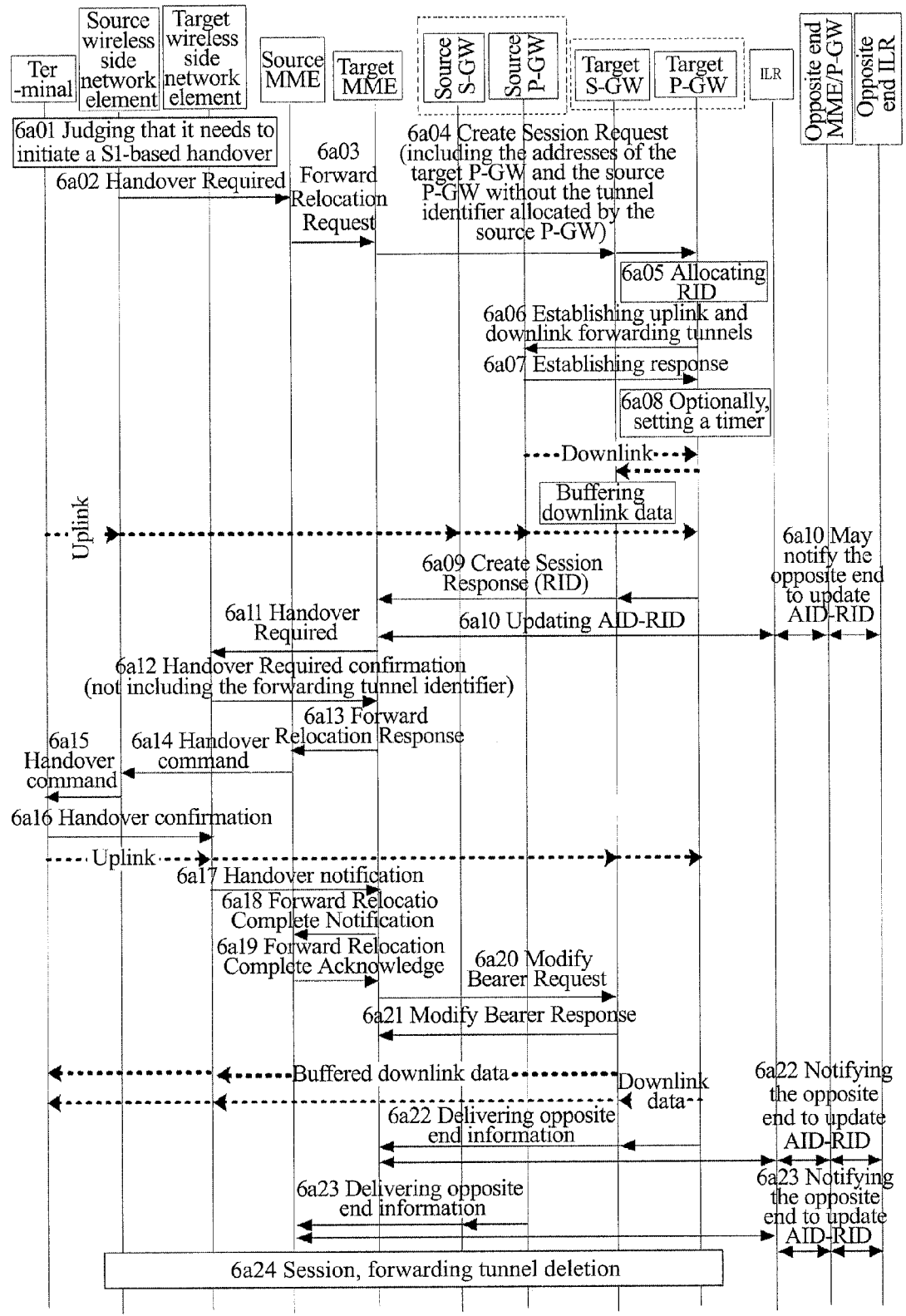
FIG. 6a is a third flowchart of a terminal handover between P-GWs provided in the present invention.

FIG. 6a illustrates a flow of a terminal handover between P-GWs based on the network architecture two shown in FIG. 3 or the architecture three shown in FIG. 4, wherein a target P-GW different from the source P-GW is determined, two P-GW interact through a signaling interface therebetween to establish a data forwarding tunnel. The target MME initiates a registration update of the terminal to the ILR, and the P-GW delivers the maintained opposite end information to the ILR through the MME. The specific steps of this flow are described as follows:

steps 6a01-6a05 are the same with steps 501-505;

steps 6a06-6a08 are the same with steps 507-509;

step 6a10, the target MME initiates a registration request of the terminal to the home ILR of the terminal, and the ILR updates the AID-RID mapping relationship of the terminal, and updates the stored RID of the terminal to the new RID;

after receiving the RID registration request, the home ILR of the terminal can initiate a RID update flow to the opposite end according to the opposite end information of the terminal stored locally, and send a RID update notification, including the AID and the new RID of the terminal, to the gateway of the opposite end. After receiving the RID update notification, the gateway of the opposite end updates the AID-RID mapping information of the terminal, i.e., updating the RID in the stored AID-RID mapping information of the terminal to the new RID included in the RID update notification.

This step is executed after step 6a09.

At this moment, the flow direction of the downlink data message sent by the correspondent opposite end to the terminal received by the target P-GW is: the target P-GW—the target S-GW, and the data will be buffered in the target S-GW and will then be sent to the terminal when in step 620.

Steps 6a11-6a21 are the same with steps 511-521;

in step 6a22, the target P-GW maintains the opposite end information of the terminal, and delivers the opposite end information to the home ILR of the terminal periodically or in real time through the target S-GW;

this step differs from step 522 in that the target P-GW needs to deliver the opposite end information to the home ILR of the terminal through the target S-GW.

In step 6a23, the source P-GW delivers the changed opposite end information to the home ILR of the terminal via the source MME, and identifies the opposite end information as needing to initiate RID update;

after receiving the opposite end information identified as needing to initiate RID update, the home ILR of the terminal sends a RID update notification to the corresponding opposite end MME, including the AID and the new RID of the terminal; the opposite end MME forwards the RID update notification to the opposite end gateway after receiving the RID update notification, and the opposite end gateway updates the AID-RID mapping information of the terminal after receiving the RID update notification.

Or, after receiving the opposite end information identified as needing to initiate RID update, the home ILR of the terminal sends a RID update notification to the corresponding opposite end gateway, including the AID and the new RID of the terminal; the opposite end gateway updates the AID-RID mapping information of the terminal after receiving the RID update notification.

This step differs from step 523 in that the source P-GW needs to deliver the opposite end information to the home ILR of the terminal via the source MME, and that the home ILR of the terminal may send the RID update notification to the opposite end gateway and/or opposite end MME when initiating a RID update flow to the opposite end.

In step 6a24, the flows of deleting the source network session and releasing the forwarding tunnel are executed, which are the same as in step 524.

Figure 7:
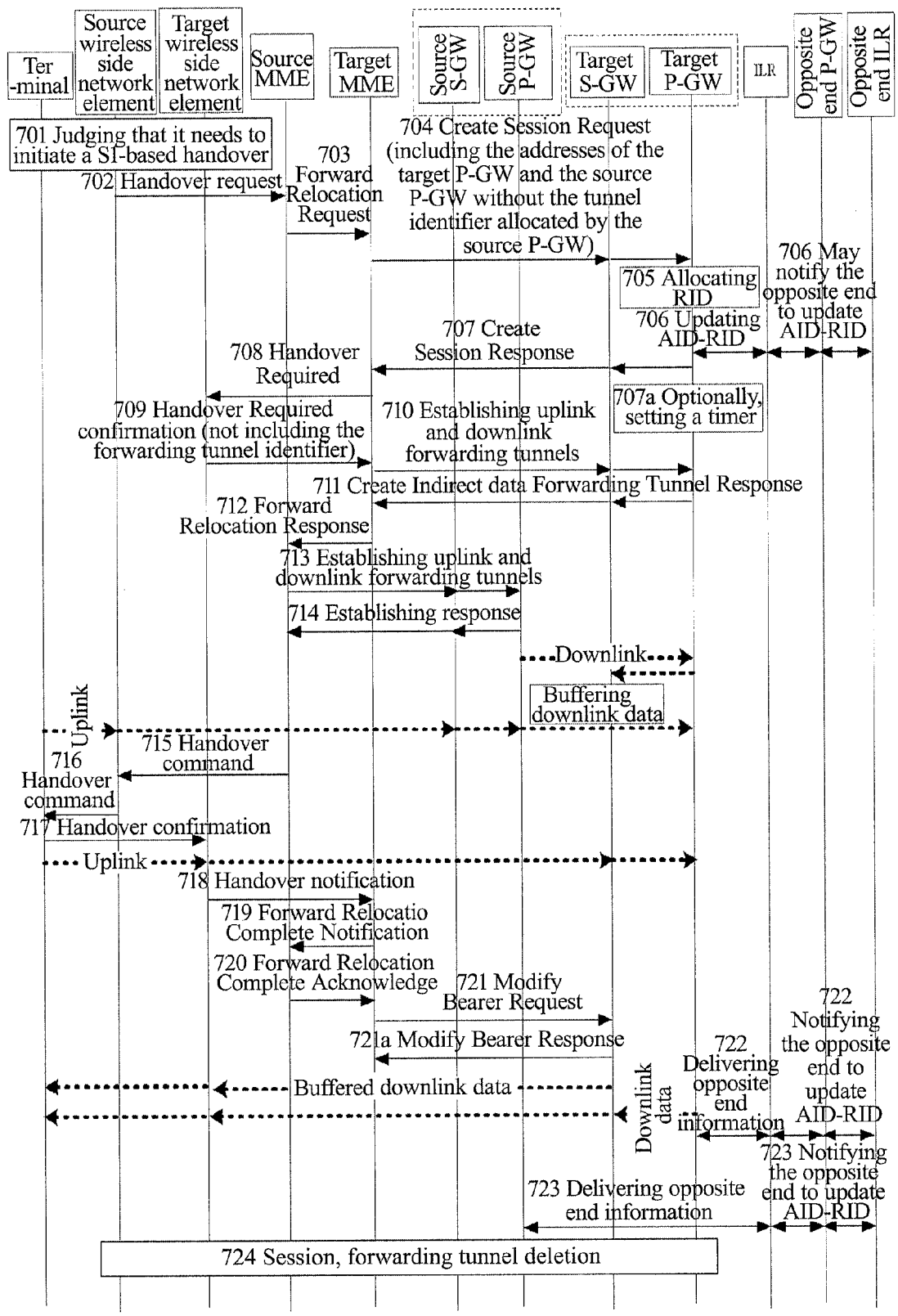
FIG. 7 is a fourth flowchart of a terminal handover between P-GWs provided in the present invention.

FIG. 7 illustrates a flow of the terminal handover between P-GWs based on the network architecture one as shown in FIG. 2. There is no interface between the P-GWs, a data forwarding tunnel is established between the source P-GW and the target P-GW through the MME, and the data are buffered in the S-GW. The specific steps of this flow are described as follows:

steps 701-706 are the same with steps 501-506;

in step 707, the target P-GW returns Create Session Response to the target S-GW, and the target S-GW returns Create Session Response to the target MME;

in step 707a, optionally, the target P-GW sets an opposite end information delivery timer and/or releasing timer;

this step is the same with step 509;

in step 708, the target MME requests the target wireless side network element to execute the handover;

in step 709, the target wireless side network element returns Handover Required confirmation message to the target MME, without including the forwarding tunnel information;

in step 710, the target MME sends Create Indirect Data Forwarding Tunnel Request to the target S-GW, and the target S-GW sends Create Indirect Data Forwarding Tunnel Request to the target P-GW to request for establishing a downlink forwarding tunnel between the source P-GW and the target P-GW, and the target P-GW allocates a forwarding tunnel identifier to the downlink forwarding tunnel after receiving the request;

in step 711, the target P-GW returns a Create Indirect Data Forwarding Tunnel Response to the target S-GW, including the forwarding tunnel identifier, and the target S-GW returns a Create Indirect Data Forwarding Tunnel Response to the target MME, including the forwarding tunnel identifier;

in another embodiment, Create Indirect Data Forwarding Tunnel Request in step 710 can be sent through Create Session Request message in step 704, and correspondingly, the message content of Create Indirect Data Forwarding Tunnel Response in step 711 such as the forwarding tunnel identifier is transmitted in Create Session Response in step 707, in which case, steps 710 and 711 are cancelled.

In step 712, the target MME sends a Forward Relocation Response message to the source MME;

in step 713, the source MME sends Create Indirect Data Forwarding Tunnel Request to the source S-GW, and the source S-GW sends Create Indirect Data Forwarding Tunnel Request to the source P-GW to request for establishing a downlink forwarding tunnel between the source P-GW and the target P-GW, including the forwarding tunnel identifier allocated by the target P-GW;

this flow may also be that the terminal establish an uplink forwarding tunnel between the source P-GW and the target P-GW, and the target P-GW allocates a forwarding tunnel identifier to the uplink forwarding tunnel and delivers it to the source P-GW.

In step 714, the source P-GW returns a Create Indirect Data Forwarding Tunnel Response to the source S-GW, and the source S-GW returns a Create Indirect Data Forwarding Tunnel Response to source MME, where the response includes the opposite end information of terminal, and may also include the AID-RID mapping information of all correspondent opposite ends of the terminal, and the source MME buffers the received opposite end information, or the opposite end information and the AID-RID mapping information;

at this moment, the data flow direction is as follows:

the flow direction of the downlink data message sent to the terminal received by the source P-GW is: the source P-GW—the target P-GW—the target S-GW, the data will be buffered in the target S-GW.

The flow direction of the downlink data message sent to the terminal received by the target P-GW is: the target P-GW→the target S-GW, the data will be buffered in the target S-GW.

The flow direction of the uplink data message sent by the terminal is: the terminal—the source wireless side network element—the source S-GW—the source P-GW, and the message may also be forwarded via the target P-GW after the source P-GW.

In step 715, the source MME sends a Handover command to the source wireless side network element;

in step 716, the source wireless side network element sends the Handover command to the terminal;

in step 717, the terminal initiates a handover confirmation message to the target wireless side network element;

in step 718, the target wireless side network element notifies the target MME to perform handover;

in step 719, the target wireless side network element sends a Forward Relocation Complete Notification message to the source MME;

in step 720, the source MME returns a relocation forward completion confirmation message to the target MME;

in step 721, the target MME requests the target S-GW to modify the bearer information;

in step 721a, the target S-GW returns a modify bearer response to the target MME;

steps 722-724 are the same with steps 522-524.

In the above flowchart in FIG. 7, the target S-GW finds in step 704 that the handover is a handover between P-GWs, the downlink data arriving subsequently need to be buffered until step 721 when the downlink data are sent to the terminal after the data tunnel between the target S-GW and the target wireless side network element is established.

The above flow only differs from the handover flow shown in FIG. 5 in the manner of establishing the forwarding tunnel.

The above flowchart in FIG. 7 reflects the scenairo where the target S-GW buffers data, and in a case where a target wireless side network element is used to cache data, step 721 and step 721a need to be moved up after step 709. Except the above difference, other steps are the same as in FIG. 7, and thus will not be described here.

Figure 8:
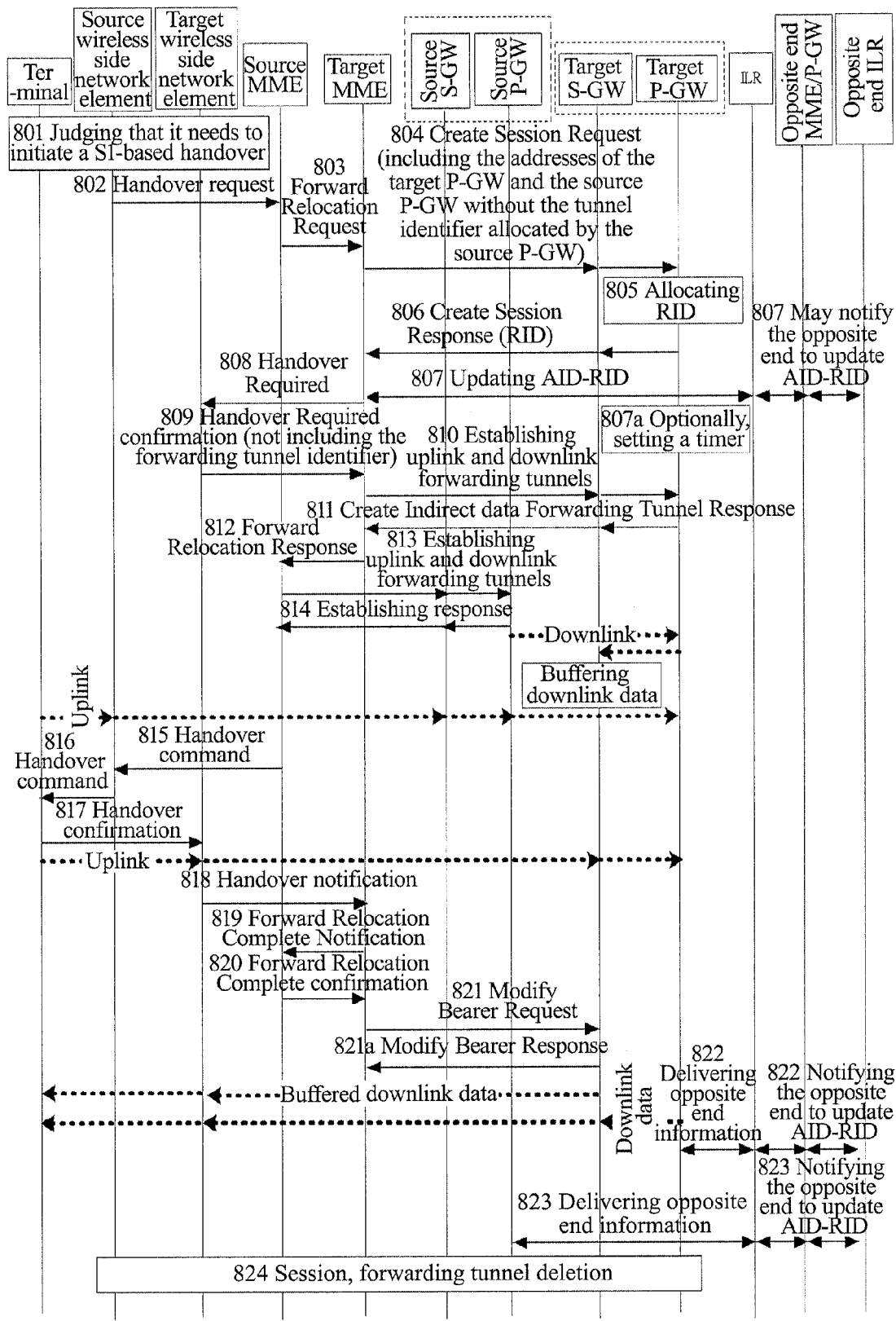
FIG. 8 is a fifth flowchart of a terminal handover between P-GWs provided in the present invention.

FIG. 8 illustrates a flow of the terminal handover between P-GWs based on the network architecture two as shown in FIG. 3. There is no interface between the P-GWs, a data forwarding tunnel is established between the source P-GW and the target P-GW through the MME, and the data are buffered in the S-GW. The specific steps of this flow are described as follows:

steps 801-805 are the same with steps 701-705;

in step 806, the target P-GW returns Create Session Response to the target S-GW, and the target S-GW returns Create Session Response to the target MME, including the new RID information of the terminal;

in step 807, the target MME initiates a RID registration request of the terminal to the home ILR of the terminal, and the ILR updates the AID-RID mapping relationship of the terminal;

after receiving the RID registration request, the home ILR of the terminal can initiate a RID update flow to the opposite end according to the opposite end information of the terminal stored locally, and send a RID update notification, including the AID and the new RID of the terminal, to the gateway and/or MME of the opposite end. After receiving the RID update notification, the gateway of the opposite end updates the AID-RID mapping information of the terminal, i.e., updating the RID in the stored AID-RID mapping information of the terminal to the new RID included in the RID update notification.

Steps 807*a*-824 are the same with steps 707*a*-724.

The above flowchart in FIG. 8 reflects the scenario of the network architecture two shown in FIG. 3, and as for the network architecture three shown in FIG. 4, similar to FIG. 6*a*, the step 822 of FIG. 8 needs to be modified to: the target P-GW delivers the maintained opposite end information to the home ILR of the terminal periodically or in real time through the target MME; step 823 is modified to: the source P-GW transmits changed opposite end information to the home ILR of the terminal through the source MME, and identifies the changed opposite end information as opposite end information to initiate RID update. Except the above difference, other steps are the same as in FIG. 8, and thus will not be described here.

Figure 9:
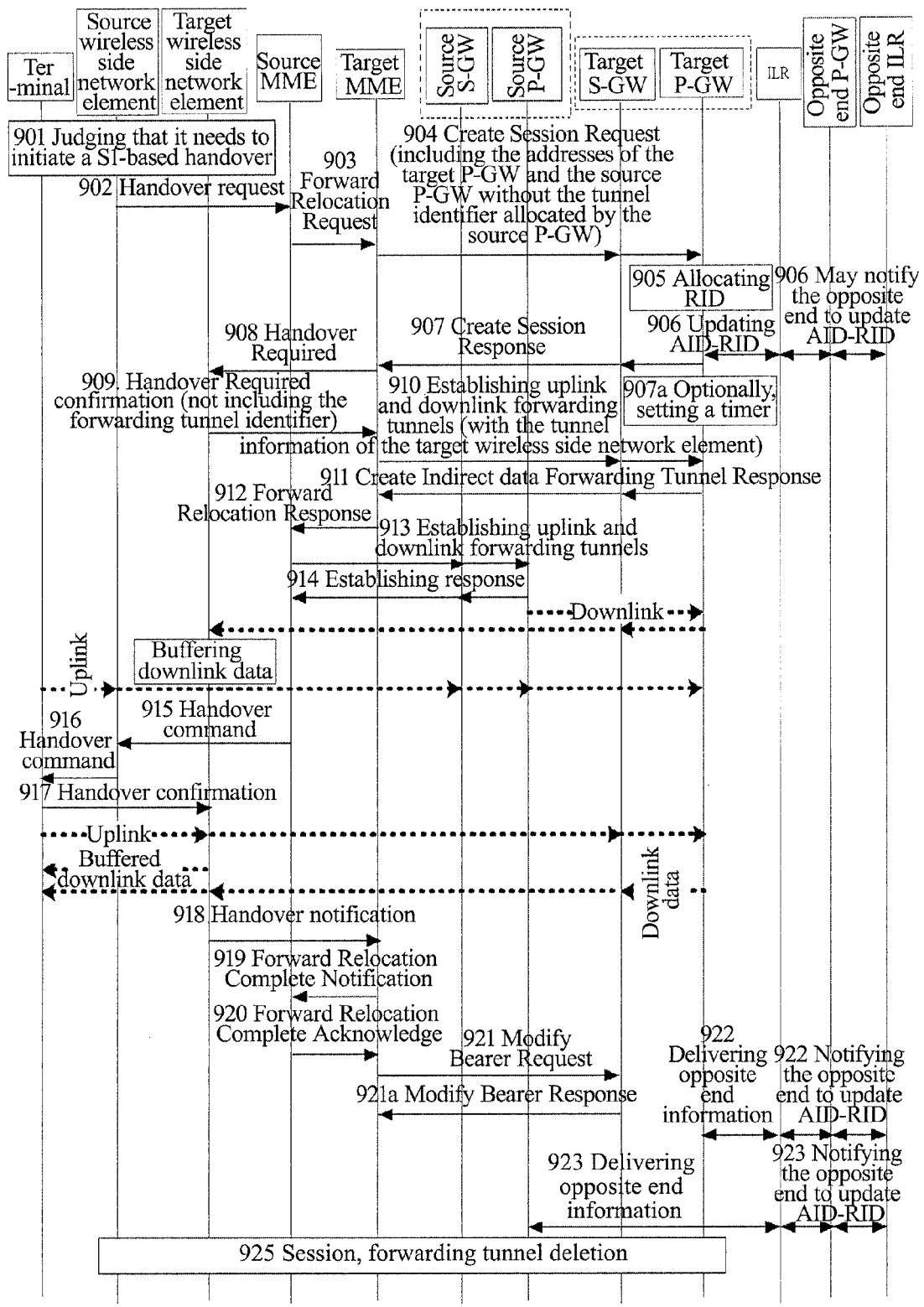
FIG. 9 is a sixth flowchart of a terminal handover between P-GWs provided in the present invention.

FIG. 9 illustrates a flow of the terminal handover between P-GWs based on the network architecture one as shown in FIG. 2. There is no interface between the P-GWs, a data forwarding tunnel is established between the source P-GW and the target P-GW through the MME, and the data are buffered in the wireless side network element.

The steps of this flow are substantially the same with those in the flow of FIG. 7, with steps 901-924 corresponding to steps 701-724 respectively, except in that:

on the basis of step 709, in step 909, the handover request confirmation message returned from the target wireless side network element to the target MME needs to include the tunnel information allocated by the target wireless side network element for establishing a tunnel to the target MME;

on the basis of step 710, in step 910, Create Indirect Data Forwarding Tunnel Request message sent from the target MME to the target S-GW needs to include the tunnel information allocated by the target wireless side network element, and the target establishes a downlink tunnel to the target wireless side network element after receiving the message;

such, after the forwarding tunnel between the source P-GW and the target P-GW is established in step 914, the downlink data message sent to the terminal received by the source P-GW is buffered in the target wireless side network element after being forwarded by the target P-GW and the target S-GW.

Similarly, based on the network architecture two shown in FIG. 3, on the basis of the flow of FIG. 8, a downlink tunnel can be established for the terminal between the target S-GW and the target wireless side network element in advance by delivering to the target MME the tunnel information allocated by the target wireless side network element for establishing a tunnel to the target S-GW in step 810 and including the tunnel information in Create Indirect Data Forwarding Tunnel Request message sent from the target MME to the target S-GW in step 811, such that the downlink data message sent to the terminal received by the source P-GW is buffered in the target wireless side network element after being forwarded by the target P-GW and the target S-GW.

As for the case of network architecture three shown in FIG. 4, the processing is similar to steps 6*a*22 and 6*a*23 in FIG. 6*a*, and other steps are similar to the processing based on the network architecture two shown in FIG. 3 and will not be described here in detail.

In order to simplify the description, all of the above examples only describe the processing when the terminal moves between P-GWs in a wireless communication system by taking the non-roaming terminal in FIGS. 2, 3 and 4 as an example. In the event that the terminal roams, the processing manner for the handover of the terminal between P-GWs is quite similar to the above examples, and no effect will be caused to the depiction of the present invention, and thus will not be repeated here.

In order to simplify the description, all of the above examples only describe the processing when the terminal moves between P-GWs in a wireless communication system by taking a case where the MME changes as an example. In the event that the terminal moves and the MME does not change, the processing for the handover of the terminal does not need signaling interaction between MMEs, and other processing is quite similar to the above examples, no effect will be caused to the depiction of the present invention, and thus will not be repeated here.

In order to simplify the description, all of the above examples only describe the processing for access identifier and locator separation of the system by taking a system including a MME as an example. In a system including a S4 GPRS Serving GPRS Support Node (SGSN), the processing manner of the system for access identifier and locator separation is quite similar to the above examples, no effect will be caused to the depiction of the present invention, and thus will not be repeated here.

In the above examples, the RID may be the IP address of the P-GW. The AID may be signed on the home subscriber server, and is the terminal identifier, for example, IPV6/IPV4 address or International Mobile Subscriber Identity (IMSI) or temporary identifier or Network Access Identifier (NAI). The mobility management entity includes MME and S4 SGSN.

The P-GW may be integrated with the S-GW into one access network, in which case, no interface between the S-GW and P-GW needs to exist in the above examples, and all network elements between the S-GW and P-GW will have an interface with the access network element. The network element functions, interfaces (except S5 interface) and flows of the system are the same as the above examples, and thus will not be described here in detail.

In addition, a method based on real-time flow detection may be used on the P-GW to maintain the information about the communication relationship between the terminal and the opposite end, and it may also be implemented in the access network element (if the P-GW is integrated with the S-GW into one access network).

The query for the home HSS, ILR, PTF of the terminal may be implemented by querying the local configuration.

The ILR or PTF function can be implemented through HSS/HLR/AAA, or be integrated with/separated from HSS/HLR/AAA.

In addition, the present invention further provides a system for terminal handover in a wireless communication system, comprising a packet data network gateway, a mobility management entity, and an ILR which has an interface with the gateway and/or the mobility management entity, wherein:

the mobility management entity is used to, after receiving a new Routing Identifier (RID) of a terminal sent by the gateway, initiate registration update including a new RID of the terminal to a home Identity Location Register (ILR) of the terminal;

the gateway is used to allocate a new RID to the switched-in terminal, and store a mapping relationship between an Access Identifier (AID) and the new RID; and initiate registration update including the new RID of the terminal to the home ILR of the terminal, or send the new RID of the terminal to the mobility management entity; and, after receiving a notification of updating a RID of an opposite end from a correspondent opposite end, update RID information of the opposite end, and return an update response;

the ILR is used to, after receiving the registration update, update stored AID-RID mapping information of the terminal according to the new RID of the terminal, and initiate a notification of updating the RID of the terminal to an opposite gateway and/or an opposite mobility management entity of the terminal according to opposite end information of the terminal which is received and/or stored locally; and, update the RID information of the opposite end after receiving the notification of updating the RID of the opposite end from the correspondent opposite end.

Furthermore, the gateway comprises:

an opposite end information maintaining module, which is used to maintain the opposite end information of the terminal, comprising an AID of an opposite end of the terminal and AID-RID mapping information of the opposite end of the terminal;

an opposite end information delivering module, which is used to deliver the opposite end information of the terminal to the home ILR of the terminal directly or via an source mobility management entity, wherein, the delivered opposite end information of the terminal at least comprises the AID of the opposite end of the terminal.

Furthermore, the opposite end information maintaining module is used to:

when receiving an uplink data message sent by the terminal to the correspondent opposite end and a downlink data message sent by the correspondent opposite end to the terminal, check an AID of the correspondent opposite end in the uplink or downlink data message, and inquire whether information of the correspondent opposite end is stored locally according to the AID of the correspondent opposite end, if not, store the opposite end information, the opposite end information at least comprising the AID information of the correspondent opposite end; and, when detecting through real-time streaming or receiving a notification that the correspondent opposite end of the terminal is offline, delete the information of the correspondent opposite end from the maintained opposite end information.

Furthermore, the opposite end information delivering module is used to deliver the opposite end information of the terminal to the home ILR of the terminal directly or via the source mobility management entity in real time or periodically;

the ILR comprises: an information storing module, which is used to store the AID-RID mapping information of the terminal, and receive the opposite end information of the terminal; an information updating and notifying module, which is used to, after receiving the registration update, update stored AID-RID mapping information of the terminal, and initiate a notification of updating the RID of the terminal to an opposite gateway and/or an opposite mobility management entity of the terminal according to stored opposite end information of the terminal.

Furthermore, the opposite end information delivering module is used to, when a terminal has a handover, deliver the opposite end information of the move-out terminal and switched-in terminal to the home ILR of the terminal directly or via the mobility management entity;

the ILR further comprises: an information storing module, which is used to store the AID-RID mapping information of the terminal; an information updating and notifying module, which is used to, after receiving the registration update, update stored AID-RID mapping information of the terminal, and initiate a notification of updating the RID of the terminal to an opposite gateway and/or an opposite mobility management entity of the terminal according to the received opposite end information of the terminal.

Furthermore, the information updating and notifying module is used to inquire the RID of the correspondent opposite end locally or to the home ILR of the correspondent opposite end according to the AID of the correspondent opposite end in the opposite end information of the terminal, and send the notification of updating the RID of the terminal, which includes the AID of the terminal and the new RID, to the gateway or mobility management entity of the correspondent opposite end.

Furthermore, the handover system further comprises a S-GW connected with the gateway, and the S-GW is used to establish between the move-in terminal and the target gateway and the target wireless-side network element for the move-in terminal, forward data message, and deliver information interacted between the mobility management entity and the gateway.

Figure 10:
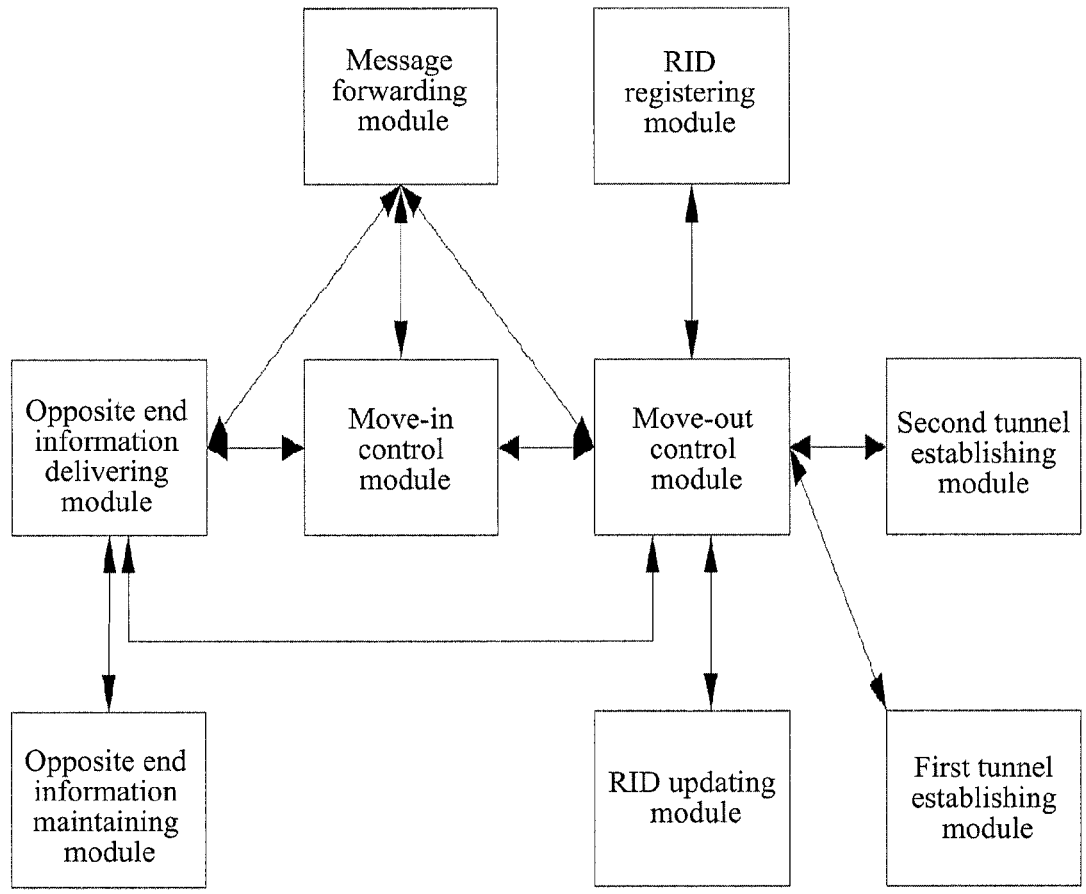
FIG. 10 illustrates the composition of a P-GW provided in the present invention.

Furthermore, the gateway may be a P-GW, as shown in FIG. 10, which shows the P-GW and the functional modules related with the handover. The gateway further comprises the following modules in addition to the above opposite end information maintaining module and the opposite end information delivering module:

a move-in control module, which is used to allocate a new RID pointing to the present gateway for the move-in terminal, and store the mapping information between the AID of the terminal and the new RID;

a message forwarding module, which is used to perform RID encapsulation, RID de-encapsulation and forwarding processing for the move-in, move-out terminals;

a first tunnel establishing module, which is used to establish a forwarding tunnel between the move-in terminal and the target S-GW for the move-in terminal.

Furthermore, the gateway further comprises an RID registering module; the move-in control module of the gateway is further used to activate the RID registering module after allocating the new RID to the move-in terminal; the RID registering module is used to initiate registration update, which includes the new RID of the move-in terminal, to the home ILR of the move-in terminal; or the move-in control module of the gateway is further used to, after allocating the new RID to the move-in terminal, deliver the new RID to the target mobility management entity via the target S-GW; the target mobility management entity further comprises an RID registering module, and the RID registering module of the target mobility management entity is used to, after receiving the new RID of the move-in terminal, initiate registration update, which includes the new RID of the move-in terminal, to the home ILR of the move-in terminal.

Furthermore, the gateway further comprises a second tunnel establishing module; the move-in control module of the gateway is further used to activate the second tunnel establishing module after allocating the new RID to the move-in terminal;

the second tunnel establishing module is used to send Create Indirect Data Forwarding Tunnel Request, which includes tunnel information allocated for the present gateway to establish a forwarding tunnel to the source gateway for the move-in terminal, to the source gateway of the move-in terminal via a signaling interface between gateways; and, after receiving a request for establishing a forwarding tunnel for a move-out terminal sent from the target gateway, return a Create Indirect Data Forwarding Tunnel Response to the target gateway.

Obviously, a person having ordinary skill in the art can appreciate that each above module or each step in the present invention can be implemented by a universal computing device, and they may be integrated on a single computing device, or distributed in a network composed of multiple computing devices. Optionally, they are implemented by program codes executable by a computing device such that they can be stored in a storage apparatus and are implemented by the computing device, or they are formulated into various integrated circuit modules, or several modules or steps among them are formulated into a single integrated circuit module to be implemented. Thus, the present invention is not limited to any specific form of combination of hardware and software.

The above examples are just preferred examples of the present invention, and are not used to limit the present invention. For a person having ordinary skill in the art, the present invention may have various modifications and changes. Any modification, equivalent replacement and improvement made within the spirit and principle of the present invention shall fall into the protection scope of the present invention.

INDUSTRIAL APPLICABILITY

The present invention at least has the following beneficial effects:

The mode of identifier and locator separation is adopted to achieve the mobility in a non-anchor mode in a wireless communication system, thereby solving the various problems caused by only fixed anchor point mechanism being used in the existing communication system, avoiding the phenomena of data circuitousness after movement, and efficiently improving the mobility performance of the terminal in the wireless communication system;

since the home ILR of the terminal stores in normal times, or receives during the handover process the uploaded opposite end information, transmission of a large amount of opposite end information between the move-in gateway and the move-out gateway during the handover process can be avoided through initiating an RID update flow to the opposite end by the ILR of the terminal.

What is claimed is:

1. A method for terminal handover in a wireless communication system in which a packet data network gateway and/or a mobility management entity is connected to an Identity Location Register (ILR) through a signaling interface, a terminal accessing a packet data network through a packet data network gateway, and when the terminal moves between two packet data network gateways, the method comprising:

a target packet data network gateway to which the terminal moves allocating a new Routing Identifier (RID) to the terminal, and storing a mapping relationship between an Access Identifier (AID) and the new RID of the terminal; the target packet data network gateway or a target mobility management entity of the terminal initiating a registration update request including the new RID of the terminal to a home ILR of the terminal;

after receiving the registration update request, the home ILR of the terminal updating stored AID-RID mapping information of the terminal according to the new RID of the terminal, and initiating a notification of updating the RID of the terminal to packet data network gateway of an opposite communication end and/or mobility management entity of an opposite communication end of the terminal according to end information of the opposite communication end of the terminal which is received and/or stored locally.

2. The method according to claim 1, wherein,
the step of initiating a registration update request comprises: after allocating the new RID to the terminal, the target packet data network gateway directly initiating the registration update request to the home ILR of the terminal; or, the target packet data network gateway sending the new RID to the target mobility management entity, and the target mobility management entity initiating the registration update request to the home ILR of the terminal.

3. The method according to claim 2, wherein,
after the terminal moves, the source packet data network gateway of the terminal and/or target packet data network gateway delivers the end information of the opposite communication end of the terminal to the home ILR of the terminal directly or via a mobility management entity;
the home ILR of the terminal initiates the notification of updating the RID of the terminal according to the received end information of the opposite communication end of the terminal and the registration update request.

4. The method according to claim 3, wherein,
when the target packet data network gateway initiates the RID registration request, or sends the new RID to the target mobility management entity, the maintained end information of the opposite communication end of the terminal is included;
after receiving the new RID and the end information of the opposite communication end, the end information of the opposite communication end is included when the target mobility management entity initiates the RID registration request;
after receiving the RID registration request, the home ILR of the terminal initiates the notification of updating the RID of the terminal according to the end information of the opposite communication end included in the RID registration request.

5. The method according to claim 3, wherein,
the source packet data network gateway and/or target packet data network gateway sets a delivery timer when establishing a forwarding tunnel, and when the delivery timer times out, deliver the maintained end information of the opposite communication end of the terminal to the home ILR of the terminal; or,
when the established forwarding tunnel is released, the source packet data network gateway and/or target packet data network gateway delivers the maintained end information of the opposite communication end of the terminal to the home ILR of the terminal.

6. The method according to claim 5, wherein,
when delivering the end information of the opposite communication end of the terminal to the home ILR of the terminal, the source packet data network gateway and/or target packet data network gateway notify the home ILR of the terminal to initiate a RID update notification; or identify the delivered end information of the opposite communication end as end information of the opposite communication end to initiate the RID update notification;
after receiving the end information of the opposite communication end the home ILR of the terminal initiates the notification of updating the RID of the terminal according to the notification of initiating RID update notification or the identifier of initiating RID update notification.

7. The method according to claim 1, further comprising:
when the home ILR of the terminal only initiates the notification of updating the RID of the terminal to the mobility management entity of the opposite communication end of the terminal, the mobility management entity of the opposite communication end forwarding the notification to the packet data network gateway of the opposite communication end after receiving the notification;

upon receiving the notification of updating the RID of the terminal sent by the home ILR or the opposite mobility management entity of the terminal, the packet data network gateway of the opposite communication end updating the AID-RID information of the terminal.

8. The method according to claim 1, the method further comprising:

before a handover, an source packet data network gateway of the terminal delivering the end information of the opposite communication end of the terminal to the home ILR of the terminal directly or through an source mobility management entity, and the home ILR of the terminal locally storing the end information of the opposite communication end of the terminal;

after receiving the registration update request, the home ILR of the terminal initiating the notification of updating the RID of the terminal according to the locally stored end information of the opposite communication end of the terminal.

9. The method according to claim 8, after the terminal moves, the method further comprising: the source packet data network gateway transmitting changed end information of the opposite communication end to the home ILR of the terminal, and identifying the changed end information of the opposite communication end as end information of the opposite communication end to initiate RID update;

after receiving the end information of the opposite communication end identified to initiate RID update, the home ILR of the terminal initiating the notification of updating the RID of the terminal to the corresponding packet data network gateway of the opposite communication end; and, the source packet data network gateway delivering the changed end information of the opposite communication end to the home ILR of the terminal in the following way:

after receiving a Create Indirect Data Forwarding Tunnel Request of the target packet data network gateway, if judging that there is end information of the opposite communication end changed after a last delivery, the source packet data network gateway delivering the changed end information of the opposite communication end to the home ILR of the terminal; or, if judging that there is end information of the opposite communication end changed after a last delivery when releasing a forwarding tunnel, the source packet data network gateway delivering the changed end information of the opposite communication end to the home ILR of the terminal once; or, after receiving the Create Indirect Data Forwarding Tunnel Request, the source packet data network gateway setting a delivery timer, and if judging when the delivery timer times out that there is end information of the opposite communication end changed after a last delivery, the source packet data network gateway delivering the changed end information of the opposite communication end to the home ILR of the terminal once.

10. The method according to claim 9, further comprising:

during a handover process of the terminal, the target packet data network gateway establishing and maintaining the end information of the opposite communication end of the terminal by detecting data messages forwarded from the forwarding tunnel by the source packet data network gateway and data messages forwarded from a general forwarding plane by other packet data network gateways, and delivering periodically or in real time to the home ILR of the terminal the end information of the opposite communication end determined by detecting the data messages forwarded from the general forwarding plane;

during a handover process of the terminal, the target packet data network gateway further establishing and maintaining the end information of the opposite communication end of the terminal by detecting data messages forwarded by a target serving gateway;

during a handover process of the terminal, the target packet data network gateway delivering to the home ILR of the terminal the end information of the opposite communication end determined by detecting data messages forwarded from the forwarding tunnel by the source packet data network gateway and data messages forwarded by the target serving gateway, and identifying the end information of the opposite communication end as end information of the opposite communication end to initiate RID update.

11. The method according to claim 8, wherein, the source packet data network gateway maintains the end information of the opposite communication end including an AID of the opposite communication end of the terminal and AID-RID mapping information of the opposite communication end;

the end information of the opposite communication end delivered by the source packet data network gateway to the home ILR of the terminal at least comprises the AID of the opposite communication end, or further comprises the AID-RID mapping information of the opposite communication end;

the method further comprises: if the end information of the opposite communication end received by the home ILR of the terminal only comprises the AID of the opposite communication end, the RID of the opposite communication end needing to be inquired from a home ILR of the opposite communication end before initiating the notification of updating the RID of the terminal; and if the end information of the opposite communication end received or stored by the home ILR of the terminal further comprises the AID-RID mapping information of the opposite communication end, the method further comprises: the packet data network gateway of the opposite communication end or mobility management entity of the opposite communication end of the terminal, after receiving the notification of updating the RID of the terminal, delivering to the home ILR of the opposite end the changed end information of the opposite communication end, which comprises the AID of the terminal and the updated RID.

12. The method according to claim 11, further comprising:

during a handover process of the terminal, the target packet data network gateway establishing and maintaining the end information of the opposite communication end of the terminal by detecting data messages forwarded from the forwarding tunnel by the source packet data network gateway and data messages forwarded from a general forwarding plane by other packet data network gateways, and delivering periodically or in real time to the home ILR of the terminal the end information of the opposite communication end determined by detecting the data messages forwarded from the general forwarding plane;

during a handover process of the terminal, the target packet data network gateway further establishing and maintaining the end information of the opposite communication end of the terminal by detecting data messages forwarded by a target serving gateway;

during a handover process of the terminal, the target packet data network gateway delivering to the home ILR of the terminal the end information of the opposite communication end determined by detecting data messages forwarded from the forwarding tunnel by the source packet data network gateway and data messages forwarded by the target serving gateway, and identifying the end information of the opposite communication end as end information of the opposite communication end to initiate RID update.

13. A system for terminal handover in a wireless communication system, comprising a packet data network gateway, a mobility management entity, and an Identity Location Register (ILR) which has a signaling interface with the packet data network gateway and/or the mobility management entity, wherein:

the mobility management entity is configured to, after receiving a new Routing Identifier (RID) of a terminal sent by the packet data network gateway, initiate registration update including a new RID of the terminal to a home ILR of the terminal;

the packet data network gateway is configured to allocate a new RID to a switched-in terminal, and store a mapping relationship between an Access Identifier (AID) and the new RID; and initiate registration update including the new RID of the terminal to the home ILR of the terminal, or send the new RID of the terminal to the mobility management entity; and, after receiving a notification of updating a RID of an opposite communication end from a correspondent opposite communication end, update RID information of the opposite communication end, and return an update response;

the ILR is configured to, after receiving the registration update, update stored AID-RID mapping information of the terminal according to the new RID of the terminal, and initiate a notification of updating the RID of the terminal to packet data network gateway of the opposite communication end and/or mobility management entity of the opposite communication end of the terminal according to end information of the opposite communication end of the terminal which is received and/or stored locally; and, update the RID information of the opposite communication end after receiving the notification of updating the RID of the opposite communication end from the correspondent opposite communication end.

14. The system according to claim 13, wherein,
the packet data network gateway comprises:
an opposite end information maintaining module, configured to maintain the end information of the opposite communication end of the terminal, comprising an AID of an opposite end of the terminal and AID-RID mapping information of the opposite end of the terminal;
an opposite end information delivering module, configured to deliver the end information of the opposite communication end of the terminal to the home ILR of the terminal directly or via an source mobility management entity, wherein, the delivered end information of the opposite communication end of the terminal at least comprises the AID of the opposite communication end of the terminal.

15. The system according to claim 14, wherein,
the opposite end information maintaining module is further configured to:
when receiving an uplink data message sent by the terminal to the correspondent opposite communication end and a downlink data message sent by the correspondent opposite communication end to the terminal, check an AID of the correspondent communication opposite end in the uplink or downlink data message, and inquire whether information of the correspondent opposite communication end is stored locally according to the AID of the correspondent opposite communication end, if not, store the end information of the opposite communication end, the end information of the opposite communication end at least comprising the AID information of the correspondent opposite communication end; and,
when detecting through real-time streaming or receiving a notification that the correspondent opposite communication end of the terminal is offline, delete information of the correspondent opposite communication end from the maintained end information of the opposite communication end.

16. The system according to claim 14, wherein,
the opposite end information delivering module is configured to deliver the end information of the opposite communication end of the terminal to the home ILR of the terminal directly or via the source mobility management entity in real time or periodically;
the ILR comprises: an information storing module, configured to store the AID-RID mapping information of the terminal, and receive the end information of the opposite communication end of the terminal; an information updating and notifying module, configured to, after receiving the registration update, update stored AID-RID mapping information of the terminal, and initiate a notification of updating the RID of the terminal to packet data network gateway of the opposite communication end and/or mobility management entity of the opposite communication end of the terminal according to the stored end information of the opposite communication end of the terminal.

17. The system according to claim 14, wherein,
the opposite end information delivering module is configured to, when a terminal has a handover, deliver the end information of the opposite communication end of a move-out terminal and a switched-in terminal to the home ILR of the terminal directly or via the mobility management entity;
the ILR comprises: an information storing module, configured to store the AID-RID mapping information of the terminal; an information updating and notifying module, configured to, after receiving the registration update, update stored AID-RID mapping information of the terminal, and initiate a notification of updating the RID of the terminal to packet data network gateway of the opposite communication end and/or mobility management entity of the opposite communication end of the terminal according to the received end information of the opposite communication end of the terminal.

18. The system according to claim 13, the system further comprising a Serving Gateway (S-GW) connected with the gateway,
the packet data network gateway further comprises:
a move-in control module, configured to allocate a new RID pointing to the packet data network gateway for a move-in terminal, and store mapping information between the AID of the terminal and the new RID;

a message forwarding module, configured to perform RID encapsulation, RID de-encapsulation and forwarding processing for the move-in terminal and a move-out terminal;

a first tunnel establishing module, configured to establish a forwarding tunnel between the move-in terminal and a target S-GW for the move-in terminal;

the S-GW is configured to establish between the move-in terminal and the target packet data network gateway and the target wireless-side network element for the move-in terminal, forwarding data message, and deliver information interacted between the mobility management entity and the packet data network gateway.

19. The system according to claim 18, wherein, the packet data network gateway further comprises an RID registering module; the move-in control module of the packet data network gateway is further configured to activate the RID registering module after allocating a new RID to the move-in terminal; the RID registering module is configured to initiate registration update, which includes the new RID of the move-in terminal, to the home ILR of the move-in terminal; or the move-in control module of the packet data network gateway is further configured to, after allocating the new RID to the move-in terminal, deliver the new RID to the target mobility management entity via the target S-GW; the target mobility management entity further comprises an RID registering module, and the RID registering module of the target mobility management entity is further configured to, after receiving the new RID of the move-in terminal, initiate registration update, which includes the new RID of the move-in terminal, to the home ILR of the move-in terminal.

20. The system according to claim 19, wherein, the packet data network gateway further comprises a second tunnel establishing module; the move-in control module of the packet data network gateway is further configured to activate the second tunnel establishing module after allocating the new RID to the move-in terminal;

the second tunnel establishing module is configured to send Create Indirect Data Forwarding Tunnel Request, which includes tunnel information allocated for the packet data network gateway to establish a forwarding tunnel to an source packet data network gateway for the move-in terminal, to the source packet data network gateway of the move-in terminal via a signaling interface between packet data network gateways; and, after receiving a request for establishing a forwarding tunnel for a move-out terminal sent from the target packet data network gateway, return a Create Indirect Data Forwarding Tunnel Response to the target packet data network gateway.

* * * * *